United States Patent
Urban

(10) Patent No.: US 10,676,284 B2
(45) Date of Patent: Jun. 9, 2020

(54) WINDOW-BASED DELIVERY APPARATUS FOR PACKAGES CONVEYED BY DRONES

(71) Applicant: Corverity Corporation, San Francisco, CA (US)

(72) Inventor: Joseph Urban, San Francisco, CA (US)

(73) Assignee: Corverity Corporation, San Francisco, CA (US)

( * ) Notice: Subject to any disclaimer, the term of this patent is extended or adjusted under 35 U.S.C. 154(b) by 0 days.

(21) Appl. No.: 16/363,752

(22) Filed: Mar. 25, 2019

(65) Prior Publication Data

US 2019/0291961 A1 Sep. 26, 2019

Related U.S. Application Data

(60) Provisional application No. 62/646,921, filed on Mar. 23, 2018.

(51) Int. Cl.
*B65G 21/14* (2006.01)

(52) U.S. Cl.
CPC ...... *B65G 21/14* (2013.01); *B65G 2201/0235* (2013.01)

(58) Field of Classification Search
CPC .... B64C 39/024; B64D 1/02; B64D 2201/12; B65G 21/2072; B65G 21/14
See application file for complete search history.

(56) References Cited

U.S. PATENT DOCUMENTS

| | | | | |
|---|---|---|---|---|
| 4,090,275 A | * | 5/1978 | Jorgensen | A22C 21/0053 198/802 |
| 2012/0255835 A1 | * | 10/2012 | Date | B65G 41/005 198/588 |

* cited by examiner

*Primary Examiner* — Gene O Crawford
*Assistant Examiner* — Lester I I I Rushin
(74) *Attorney, Agent, or Firm* — Rowan TELS Corp

(57) ABSTRACT

An apparatus, method, and system are provided to accept a delivery through an opening such as a window in a wall of a package that is transported by any aerial vehicle such as a drone or other similar device. The system is completely installed on the inside of the building and extends out through the portal to receive the package from the aerial vehicle. Once the package has been transferred to this system from the aerial vehicle, it moves the package into the building through the same opening and sufficiently distances itself and the package from the opening so that the window or portal can close. The package is then placed on the floor in front of the window or portal and the apparatus moves the package to a position that allows for a space to place another package following a future delivery.

16 Claims, 23 Drawing Sheets

WINDOW-BASED DELIVERY APPARATUS FOR PACKAGES CONVEYED BY DRONES

CROSS-REFERENCE TO RELATED APPLICATIONS

This application claims the benefit of U.S. provisional patent application Ser. No. 62/646,921, filed on Mar. 23, 2018, the contents of which are incorporated herein by reference in their entirety.

BACKGROUND

Drone delivery is presently a nascent service that promises to transport a package from a variety of sources directly to a customer's location. In a vast number of cases that desired destination is the customer's home or place of business. Today that service is executed manually by a delivery person and incurs the overhead of the transportation vehicles, such as trucks, to move the person and packages, as well as the cost of employing the person executing the driving and manual delivery. In many cases the customer is not available to receive the package and an attempt must be made at a later time, thereby increasing the cost of the delivery.

Drone delivery offers the promise of reducing the logistical cost for a class of packages under a certain size and weight threshold. Yet, because existing drone delivery processes do not convey a person to execute the final step in the delivery process—that of ringing the doorbell and handing the package to the customer—drone delivery systems target areas near a person's home where the package could be either landed or lowered via a tether. Most existing systems or proposed systems offer no mitigation of potential theft if the customer is not present to receive the package. Additionally, in cases of inclement weather the package may remain outside for an excessive period of time, potentially resulting in damage to its contents. Any drone delivery device that does not protect the package from inclement weather poses a significant liability to the shipping entity. Additionally, if the contents of the package have a desirable aroma the unattended package could be damaged by an animal in pursuit of its contents. It is for these and potentially other undesirable reasons that the promise of drone delivery may not be realized unless a more secure and controlled means is made available to accept the package.

In the case where a customer lives in a city, and especially if they live in a multi-tenant building with moderate foot traffic, the only existing secure location for a drone to deliver a package may be on the roof. The promise of drone delivery may be highly constrained if every delivery requires that the customer climb to the roof to retrieve their package. This is especially true in the cases were the building is both high and requires ascending a staircase to access the roof. In the cases were the multi-tenant roof is not designed to be accessed from within, that delivery channel may be unavailable. Additionally, an elderly person should not be expected to ascend stairs or a ladder each time a package arrives. Aside from entering through an open door, the only other portal to transport a package into the interior of a building may be through the window.

BRIEF SUMMARY

A delivery platform for receiving a package, the delivery platform includes an extendable cantilever, wherein the extendable cantilever is located inside of an opening in a wall of a structure when in a retracted position, and is configured to extend through the opening in the wall to an extended position outside of the structure. The delivery platform also includes a package delivery system interface configured to receive the package delivered outside of the opening in the structure, wherein the package delivery system interface is mounted to the extendable cantilever. The delivery platform further includes a package receiving system, wherein a portion of the package receiving system is mounted to the extendable cantilever, and the package receiving system is configured to position the package over a package receiving spatial zone inside of the opening in the structure.

A package delivery system includes a delivery platform for receiving a package. The delivery platform includes an extendable cantilever, wherein the extendable cantilever is located inside of the opening in the wall of the structure when in a retracted position, and is configured to extend through the opening in the wall to an extended position outside of the structure. The delivery platform also includes a package delivery system interface configured to receive the package delivered outside of the opening in the structure, wherein the package delivery system interface is mounted to the extendable cantilever. The delivery platform further includes a package receiving system, wherein a portion of the package receiving system is mounted to the extendable cantilever, and the package receiving system is configured to position the package over a package receiving spatial zone inside of the opening in the structure.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
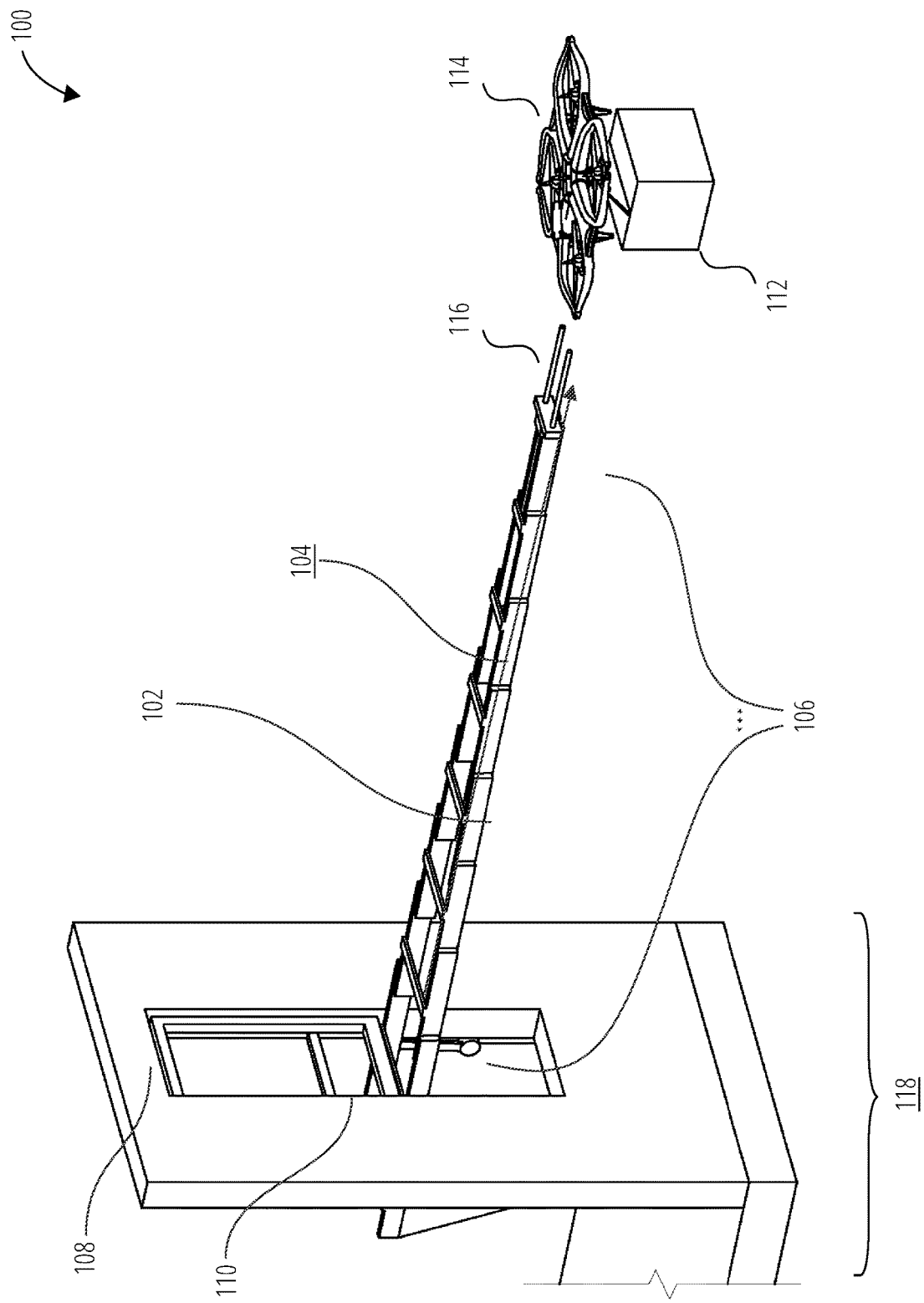
FIG. 1 illustrates a delivery platform in deployed orientation 100 in accordance with one embodiment.

This disclosure is directed to a platform that is installed within the interior of a building in close proximity to a portal in a wall such as a window. The platform may be partially automated, fully automated, or manually operated. When a drone is ready to deliver a package to that portal, the platform extends through the opened portal and provides a means for the drone to securely transfer the package to its structure. Once the transfer is verified, the drone departs and the package is retracted through the portal such that it is securely located within the building.

This disclosure is also directed to systems and methods utilizing the platform.

A fully automated platform may be dependent upon a number of systems including the communication and mechanical means to transfer the package securely from the drone to the platform. Additionally required may be the communication and signals required to coordinate the deployment of the platform with the arrival of the drone laden with the package. Further, a means to open and close the window or portal in a reliable and automated manner may need to be present.

These systems may not be required if the delivery coordination is flexible to occur at any time and the drone delivers the package to a simple, flat platform with no requirement for ensuring a secure position on that platform.

Non-Limiting Example of Usage

In example embodiments, a signal is delivered to a controlling system of a delivery platform either through the internet, electromagnetic transmission from the drone, ancillary system, or via manual trigger by the operator within the building. The delivery platform sends a signal to the system that opens the window. The telescoping cantilever is positioned in a horizontal manner on the inside of the building orthogonal to the opening of the window. The telescoping cantilever extends out of the window up to 8 feet or more in order to provide sufficient distance between the drone and the side of the building to avoid wind turbulence and to keep the blades on the drone sufficiently far away from any person or any animal that might reach out from the open window. The drone delivers the package to the extended platform. The controlling system of the platform receives a signal from the drone, a sensor on the receiving end of the system, or external automated system or manually by the operator that the package can be drawn back through the window. The platform retracts back through the window and a signal is sent to the system that closes the window. At this point the package is either on or attached to the platform and is made available to be removed by the operator or by an ancillary system or the platform delivers the package directly to the floor. If deployed to the floor, a mechanism pushes the package away from the wall so that room is made for the cantilever to be stowed and for another package to be received and placed on the floor. The fully retracted cantilever is then actuated into a stowed position below the window.

A method for receiving a package may include providing a delivery platform where the delivery platform includes an extendable cantilever, wherein the extendable cantilever is located inside of an opening in a wall of a structure when in a retracted position, and is configured to extend through the opening in the wall to an extended position outside of the structure. The delivery platform also includes a package delivery system interface configured to receive the package delivered outside of the opening in the structure, wherein the package delivery system interface is mounted to the extendable cantilever. The delivery platform further includes a package receiving system, wherein a portion of the package receiving system is mounted to the extendable cantilever, and the package receiving system is configured to position the package over a package receiving spatial zone inside of the opening in the structure. The method may further include operating the delivery platform to receive the package.

Figure 2:
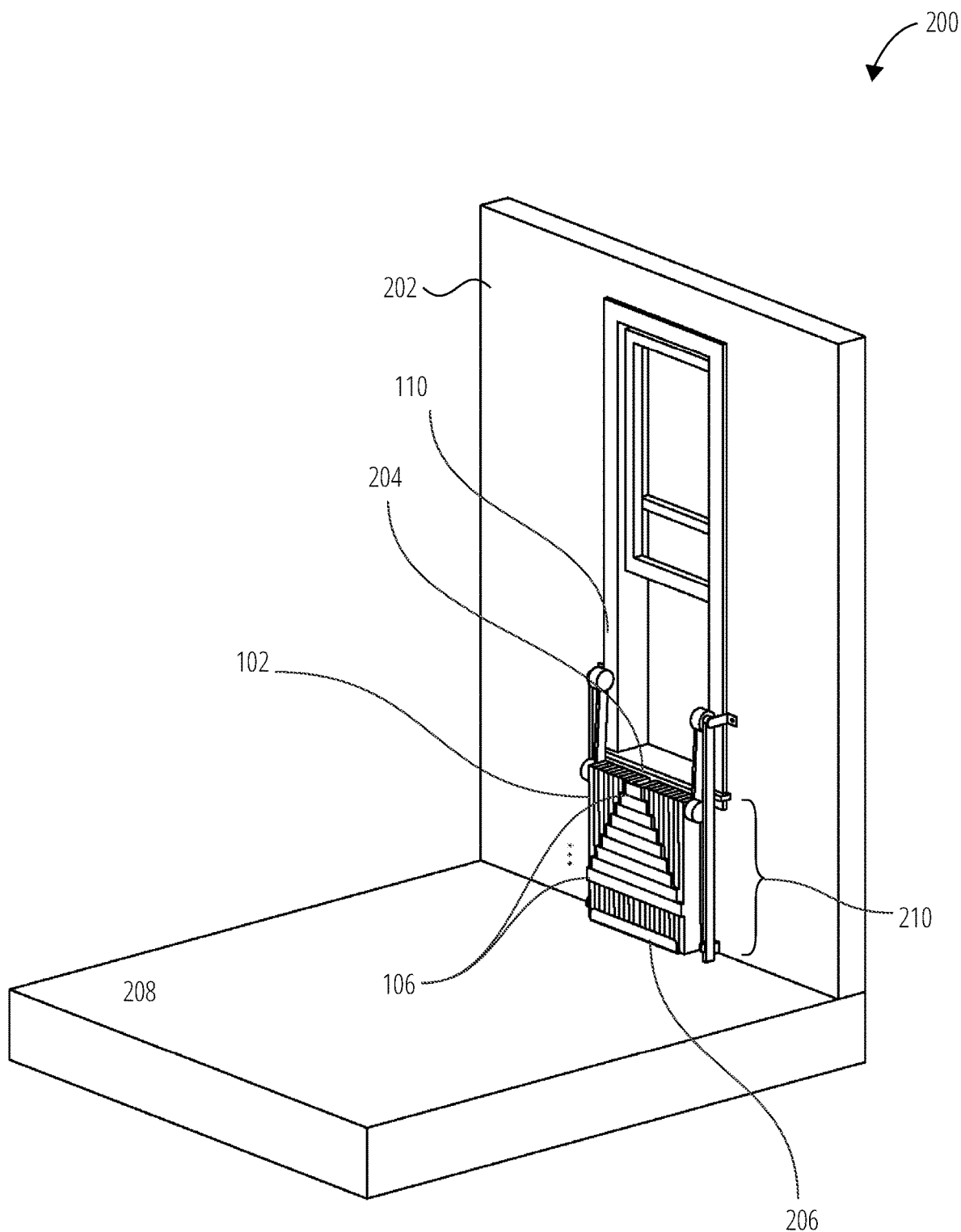
FIG. 2 illustrates a delivery platform in a stowed orientation 200 in accordance with one embodiment.

FIG. 1 illustrates a delivery platform in deployed orientation 100 in accordance with one embodiment. This apparatus comprises a telescoping cantilever 102 made up of plurality of cantilever segments 106. In an extended position 104, the telescoping cantilever 102 extends out of an opening 110, such as an open window, in a wall 108 of a structure 118. The telescoping cantilever 102 may also be retracted, with the plurality of cantilever segments 106 nesting within each other, such that the cantilever may be stowed as shown in FIG. 2. In some embodiments, an extendable cantilever may be used. The extendable cantilever may not have a plurality of cantilever segments that nest within each other. The substantially entire length of the extendable cantilever is fixed in an extended configuration and is moved in or out of the opening 110 as needed. This is contrasted with the telescoping cantilever 102, where the plurality of cantilever segments 106 allows for shortening or lengthening of the cantilever.

The extended telescoping cantilever 102, allows an unmanned aerial vehicle 114, such as a drone, to deliver a package 112 to a destination, such as a building, while maintaining sufficient distance from the building's walls to ensure the drone's safety from entities within the building, as well as from destabilizing air turbulence that may be concentrated near the walls. This turbulence may disrupt the safe operation of the drone, or disrupt the navigational process of delivering the package 112.

In addition to the unmanned aerial vehicle 114, the package may be delivered to the extended telescoping cantilever 102 by a sidewalk-based robot, an autonomous vehicle, a human such as a postal worker or delivery person, and the like.

The unmanned aerial vehicle 114 may orient the package 112 relative to a package receiving system 116 mounted at the extended end of the telescoping cantilever 102. The package receiving system 116 may be employed to connect to the unmanned aerial vehicle 114, the package 112, or another system providing the means to deliver the package 112 in a stable and repeatable manner.

This disclosure also provides a means for the package receiving system 116 to move the package 112 adjacent to, or completely through, the opening 110 by means of retracting the telescoping cantilever 102 towards the opening 110 (FIG. 6) at which point the package 112 can be detached from the package receiving system 116 manually or by a lowering system (FIG. 11) or process. The lowering system or process may be located mostly or completely on the inside of the wall 108, or incorporated into the structure of this disclosure.

FIG. 2 illustrates a delivery platform in a stowed orientation 200 in accordance with one embodiment. When not in use, the apparatus may be maintained in a stowed position, with the telescoping cantilever 102 in a retracted position 210, retracted into a compact area and held against the interior wall 202 beneath the opening 110. This may prevent the apparatus from impeding entrance or egress through the opening 110 in case of emergency.

Figure 3:
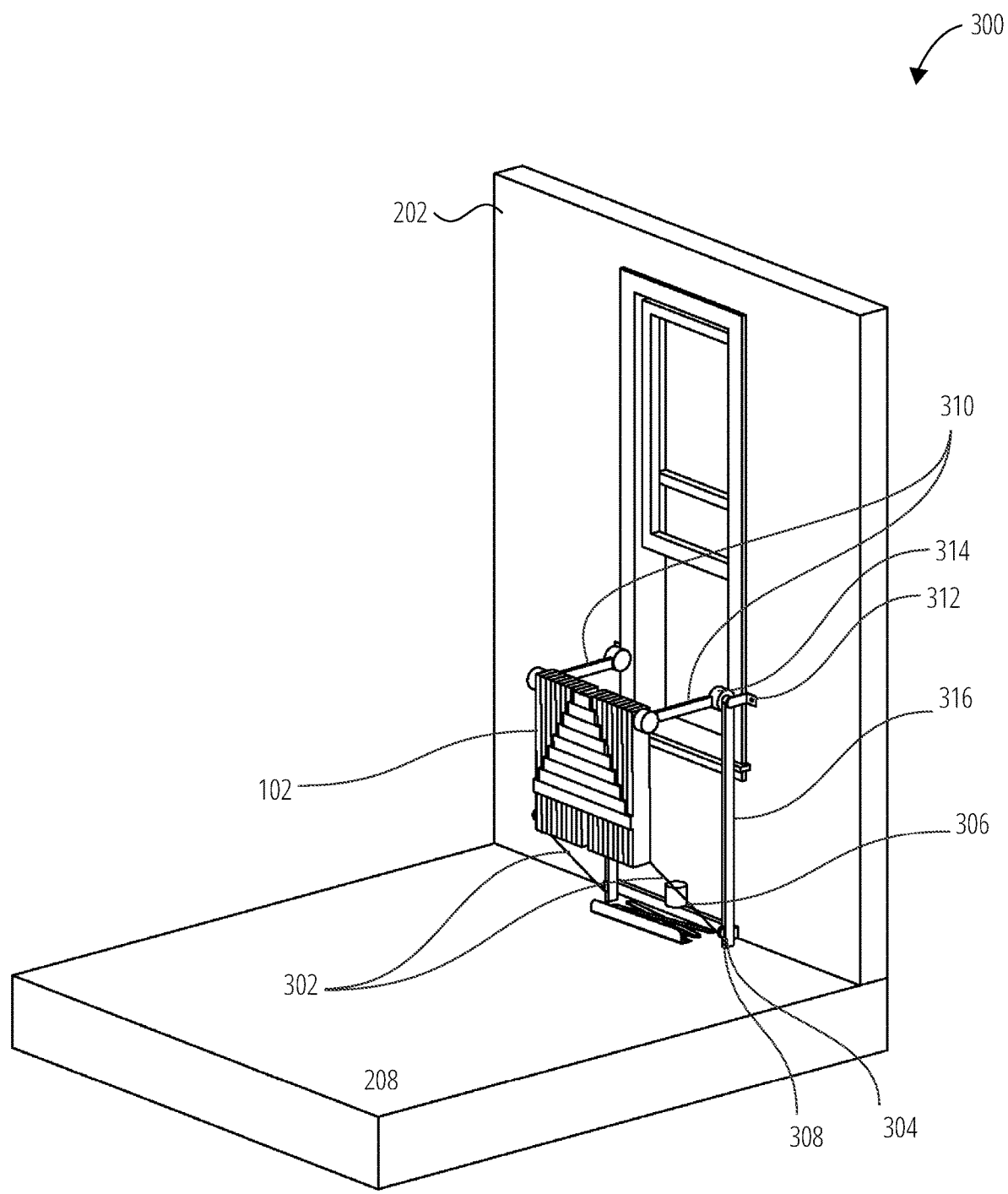
FIG. 3 illustrates a delivery platform moving from stowed orientation to pre-deployed orientation 300 in accordance with one embodiment.
Figure 4:
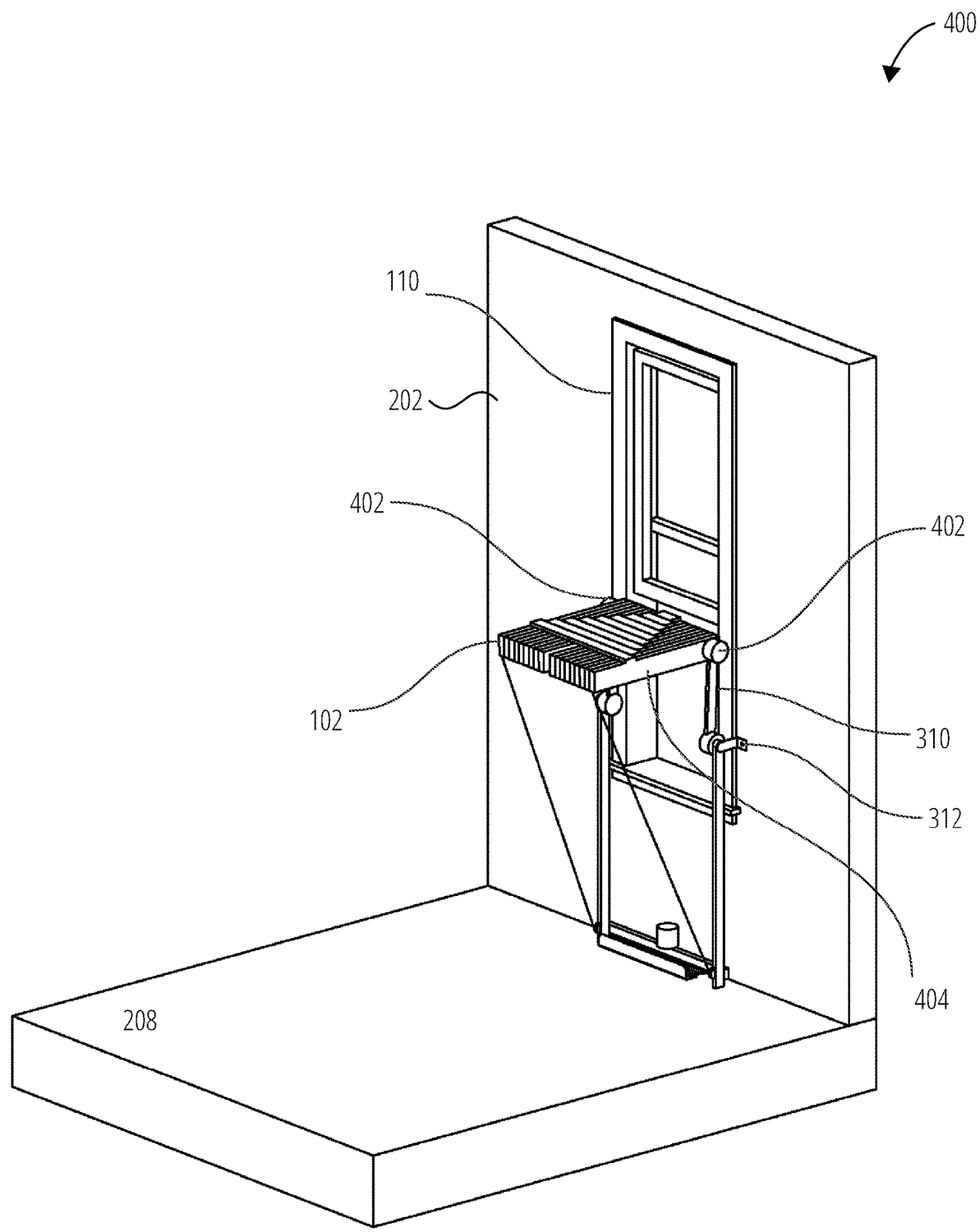
FIG. 4 illustrates a delivery platform in pre-deployment pre-deployed orientation 400 in accordance with one embodiment.

In one embodiment, the apparatus may be spring-loaded to maintain a default position of pre-deployment, as shown in FIG. 4. The apparatus may be maintained in the stowed position by means of deployment tensile members 302, the action of which is illustrated in more detail in FIG. 3 and FIG. 4. The receiving portion 204 of the telescoping cantilever 102 may be oriented upward, beneath the window sill. The anterior portion 206 of the telescoping cantilever 102 may be oriented downward, on or near the floor 208 within the opening 110. Each of the plurality of cantilever segments 106 may be aligned at the anterior portion 206 to form a compact telescoping cantilever 102 when the telescoping cantilever 102 is retracted.

FIG. 3 illustrates a delivery platform moving from stowed orientation to pre-deployed orientation 300 in accordance with one embodiment. Deployment tensile members 302 may maintain the apparatus in a stowed position when not in use by acting against the force moment of a rotational spring. The rotational spring may be implemented at or near one or more lower joints 314, each secured to the interior wall 202 with a mount 312. This mount 312 provides tensile resistance when the telescoping cantilever 102 is between its stowed and pre-deployed positions. As the telescoping cantilever 102 is deployed, the mount 312 provides compressive resistance throughout the sequence of receiving a package and retracting back through the opening 110.

The deployment tensile members 302 may each be secured to a corner of the anterior portion of the telescoping cantilever 102. A base motor 306 may be used to withdraw or release the deployment tensile members 302 to stow or deploy the apparatus, respectively. As the deployment tensile members 302 are released, the rotational spring may impel pivoting columns 310 attached to the lower joints 314 to begin rotating away from the interior wall 202, as shown.

The two lower joints 314 in the illustrated embodiment may be stabilized by connecting to the top of two stationary columns 316. The stationary columns 316 provide compression support against the floor 208 and substantially support the pivoting columns 310 and lower joints 314. The stationary columns 316 may also act to support the weight of the telescoping cantilever 102 in stowed, pre-deployed, and deployed positions, as well as the weight of the package and delivery drone as needed. The stationary columns are attached to said floor by fasteners 308 such as metal screws.

Near the floor 208, at the base of the stationary columns 316, the deployment tensile members 302 may each wrap around a lower attachment position 304 on the stationary columns 316. In this manner, the tensile force vector that allows the stowage and deployment of the apparatus may be transferred to the stationary columns 316 and, ultimately, the floor 208.

FIG. 4 illustrates a delivery platform in pre-deployment pre-deployed orientation 400 in accordance with one embodiment.

The pivoting columns 310 may be connected to the lower joints 314. The lower joints 314 may be positioned directly below the pivoting columns 310 when the cantilever is in the pre-deployed position. The pivoting columns 310 may rotate around the lower joints 314 for approximately 180 degrees from vertical positions above said lower joints 314 in the pre-deployment position to vertical positions below the lower joints 314 in the stowed position shown in FIG. 2. The pivoting columns 310 may rotate through less than about 180 degrees, such as 170 degrees, 160, degrees, 150 degrees, but is not limited thereto.

The telescoping cantilever 102 may be supported by the arms of a cantilever base element 404. The cantilever base element 404 in turn may connect to two upper joints 402 on both sides of the cantilever base element 404 at locations relatively close to the opening 110. The upper joints may be connected to the pivoting columns 310, such that when the cantilever is in the pre-deployment position, the pivoting columns 310 are oriented in a substantially vertical manner directly below the upper joints 402.

The lower joints 314 may be actuated against the moment caused by gravity against the cantilever by a rotational spring attached in such an orientation that all of the components connected in a sequence to the lower joints 314 may be rotated by the action of said spring on the lower joints 314. This may cause the cantilever to move to the pre-deployment position with little or no additional rotational force aside from said rotational spring.

Figure 5:
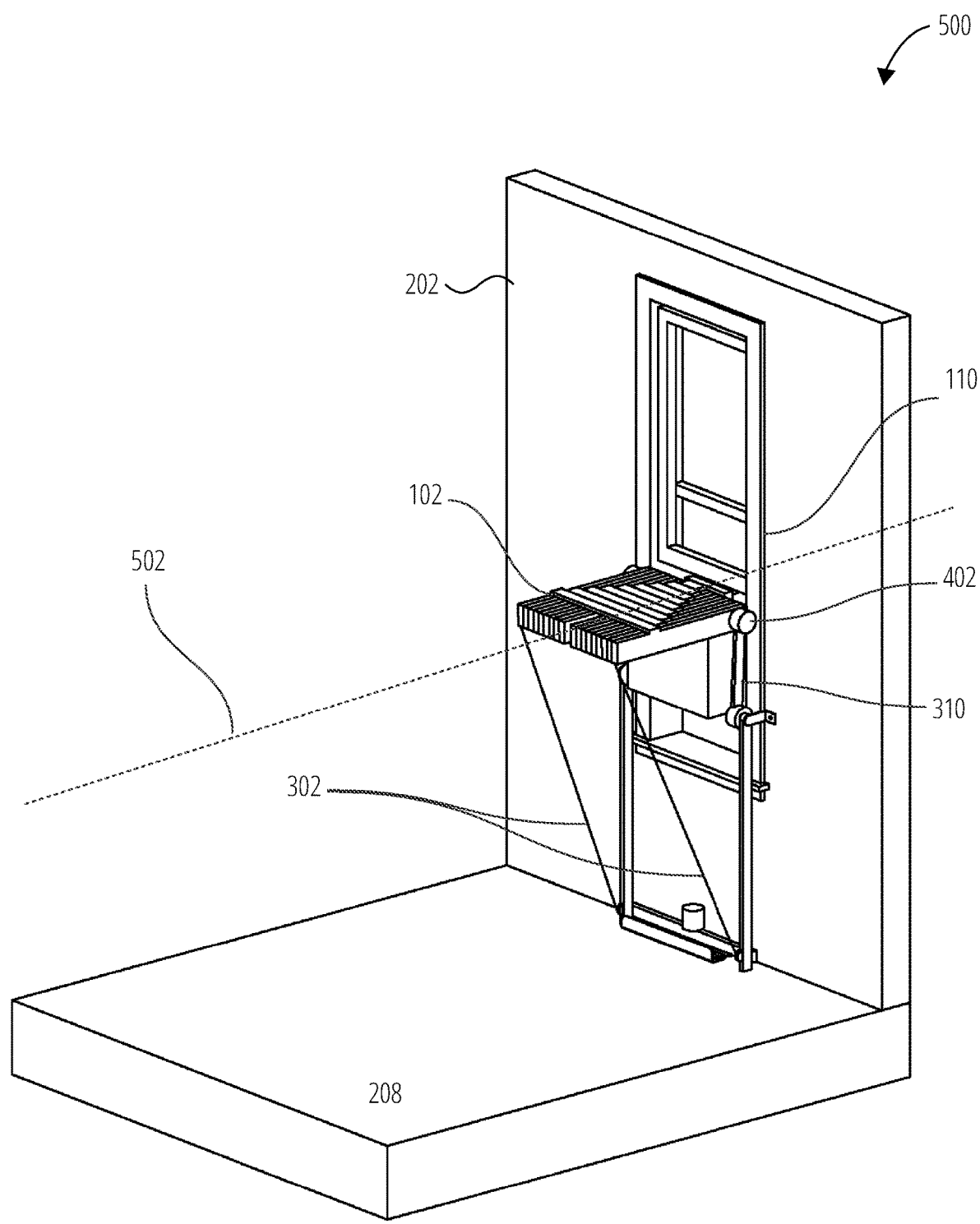
FIG. 5 illustrates a delivery platform retrieving a package 500 in accordance with one embodiment.

FIG. 5 illustrates a delivery platform retrieving a package 500 in accordance with one embodiment. The axis that runs along the cantilever's direction of extension and retraction may be called the cantilever body axis 502. When the telescoping cantilever 102 is positioned in the pre-deployment orientation, or when fully deployed through the opening 110, the projected angle between the pivot pivoting columns 310 and the cantilever body axis 502, may be approximately a right angle.

As deployment tensile members 302 are lengthened by actuation of the spool between stowed position and pre-deployment position, the cantilever may move into a position where the cantilever body axis 502 is substantially parallel to the interior wall 202 as shown in FIG. 3. The cantilever may rotate around the upper joints 402 by the moment vector of a rotational spring. Past the angle where the cantilever body axis 502 is parallel to the interior wall 202, and where the axis along the pivoting columns 310 is no longer orthogonal to the interior wall 202, the rotation around the upper joints 402 may be limited within the joints, such that there is no further rotation of the cantilever around the rotational axis of the upper joints 402. As the deployment tensile members 302 continue to lengthen, the upper joints 402 and cantilever body axis 502 may maintain a right angle orientation through the rest of the cantilever's motion into the pre-deployment position.

This right angle orientation may be maintained between the cantilever body axis 502 and the axis of the pivoting columns 310 when the cantilever body axis 502 in an approximately horizontal orientation (FIG. 3) by means of a locking rod being actuated into a set of receiving cavities in the upper joints 402. This static right angle may position the telescoping cantilever 102 orthogonally to the opening 110 so that the telescoping cantilever 102 may extend out of the opening 110. This locking condition may work in concert with the deployment tensile members 302 to resist any rotation around the axis defined by the upper joints 402 caused by the weight of the extended telescoping cantilever 102, as well as the package and aerial vehicle.

Figure 6:
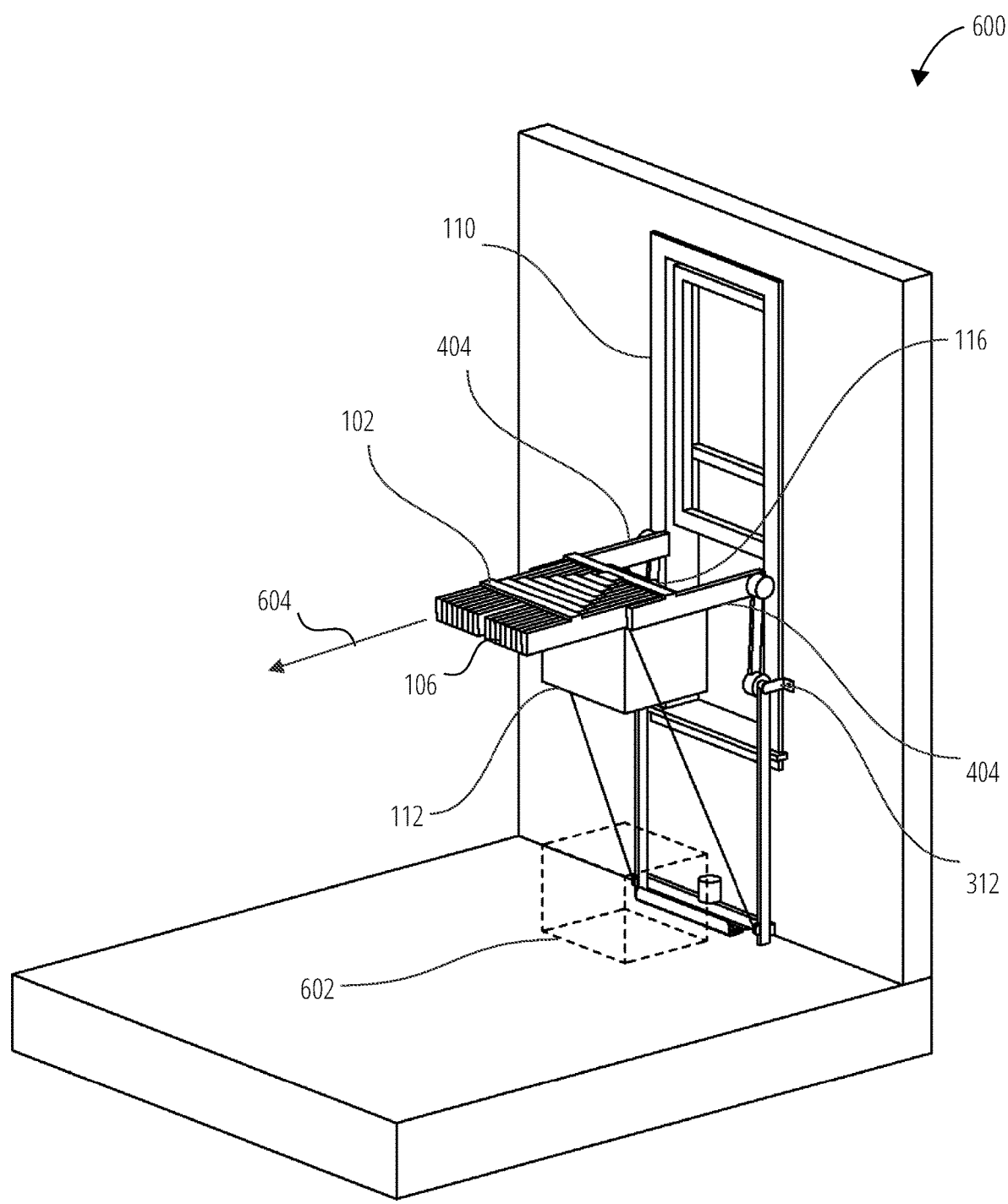
FIG. 6 illustrates a delivery platform with package fully retrieved 600 in accordance with one embodiment.

FIG. 6 illustrates a delivery platform with package fully retrieved 600 in accordance with one embodiment. The telescoping cantilever 102 may provide the means to move a set of plurality of cantilever segments 106 in the direction away from opening 604 relative to a cantilever base element 404 that remains stationary, such that the package receiving system 116 holding the package 112 may retract the package 112 completely through the opening 110 and may position the package 112 over a package receiving spatial zone 602 that has no obstruction from any component of this invention. In this position, the package 112 may be lowered to the floor in a vertically descending manner, or to another receiving platform or receiving system located on, above, or near the floor. The receiving system may be a robotic system or some other downstream process that receives the package.

The plurality of cantilever segments 106 may extend and retract along a track, rail, or conveyor component that connects each segment to its neighbors, and allows them to slide with respect to each other while remaining rigid enough in the aggregate to support the weight of the apparatus, the package 112, and an unmanned aerial vehicle 114 as needed. These tracks may restrict the motion of the segments when retracted to prevent them from moving beyond the anterior portion 206 of the retracted telescoping cantilever 102. A similar track, rail or conveyor may allow the compacted body of plurality of cantilever segments 106 to move further away from the opening 110 as described above so as to position the package 112 over the package receiving spatial zone 602.

Figure 7:
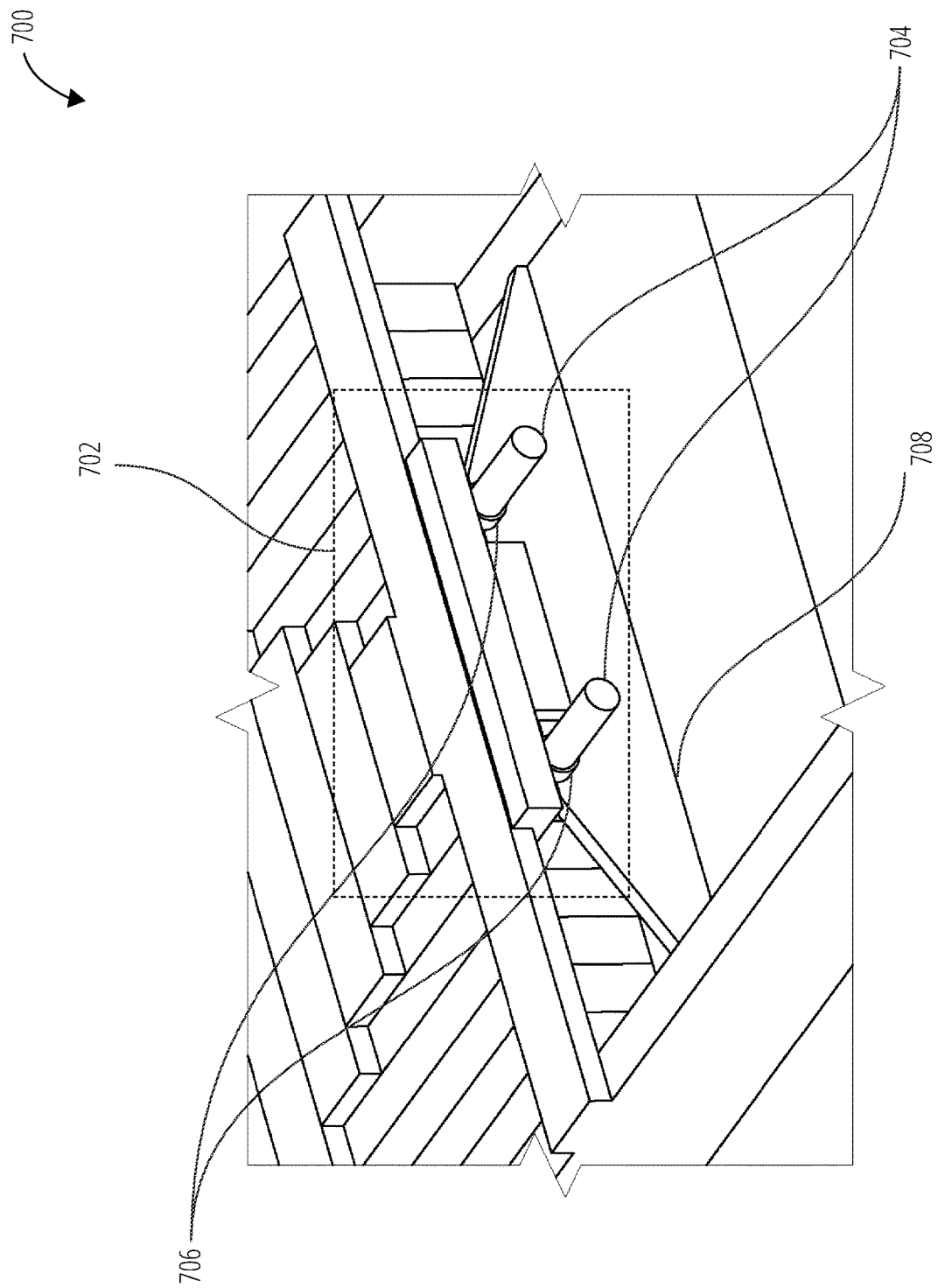
FIG. 7 illustrates a package receiving system with oblong members extended 700 in accordance with one embodiment.

FIG. 7 illustrates a package receiving system with oblong members extended 700 in accordance with one embodiment. The package receiving system 702 may comprise one or more oblong members 704, which may be used to engage with corresponding package opening 706, as part of a package interface 708.

Figure 8:
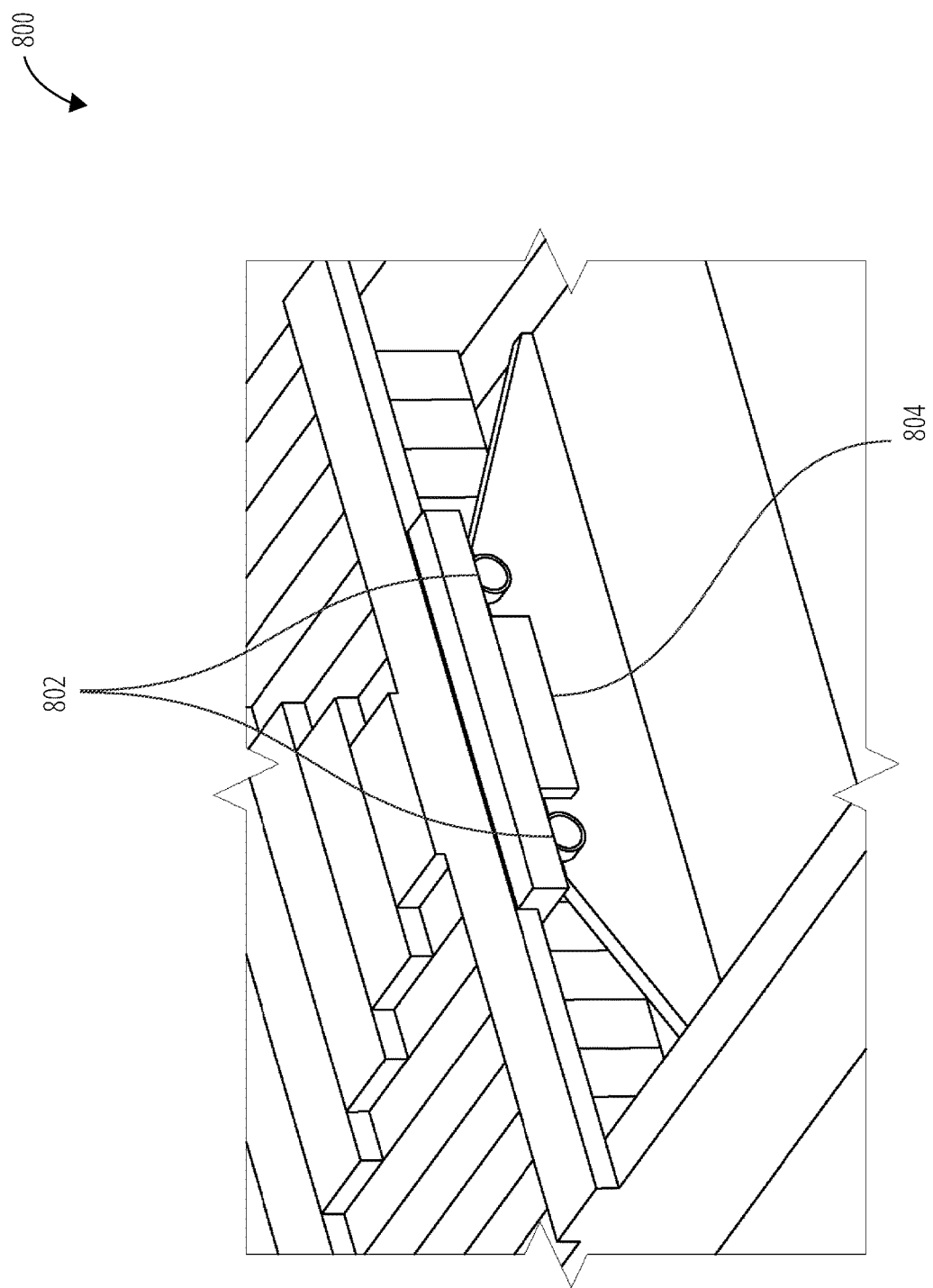
FIG. 8 illustrates a package receiving system with oblong members retracted 800 in accordance with one embodiment.

FIG. 8 illustrates a package receiving system with oblong members retracted 800 in accordance with one embodiment. The retracted oblong members 802 may release the package to the hoist mechanism 804 by retracting its components away from supporting the package, as shown. Hoist mechanism 804 may use the same elements, on the packaging interface, that the drone uses to secure to the packaging interface before connecting the package to this device. The hoist mechanism 804 delivers the package to the floor as shown in FIG. 11.

Figure 9:
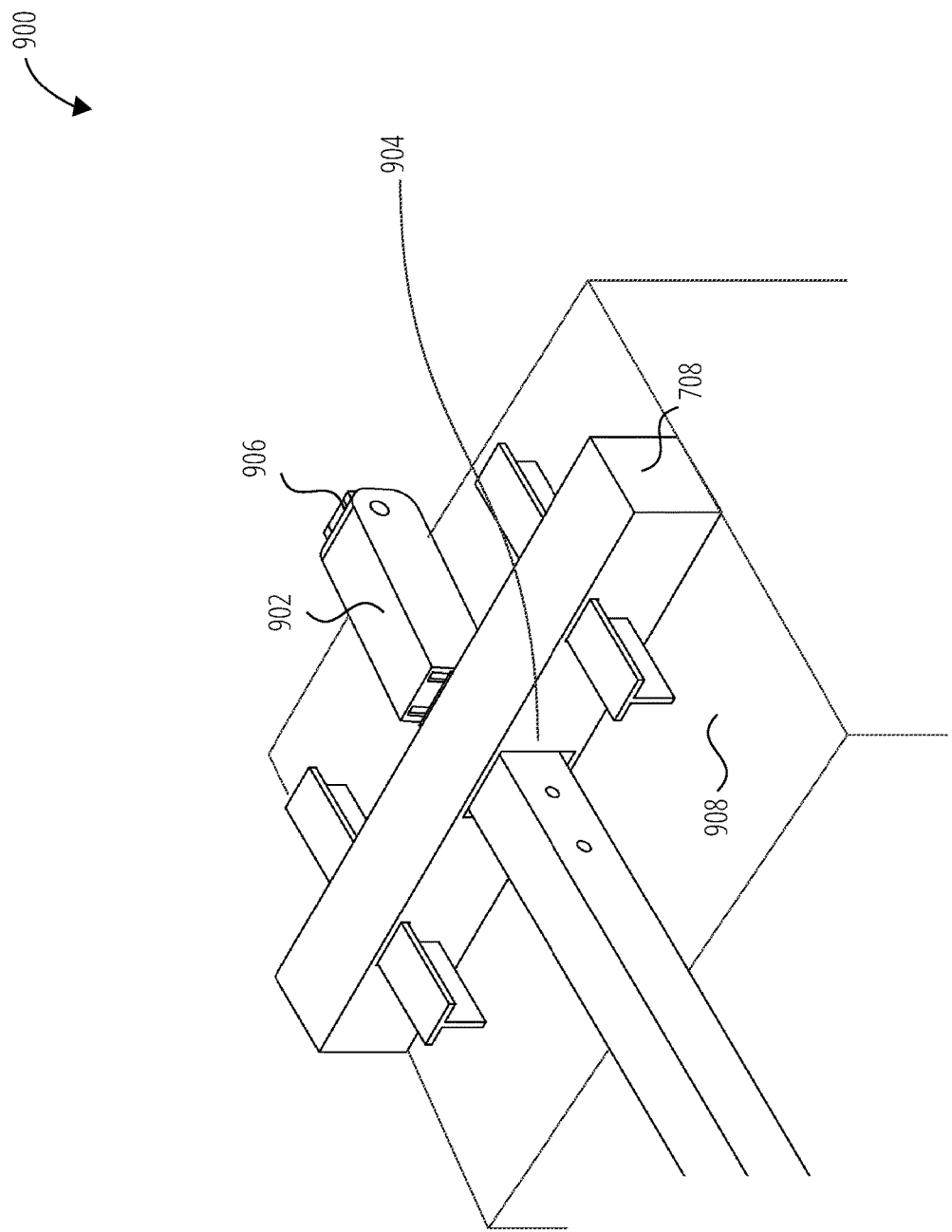
FIG. 9 illustrates a package receiving system with oblong member extended 900 in accordance with one embodiment.

FIG. 9 illustrates a package receiving system with oblong member extended 900 in accordance with one embodiment. In this embodiment, a single oblong member 902 may engage with a package interface opening 904, as part of a package interface 708. Oblong member 902 supports a ratchet device 906 at the end that penetrates to through package interface opening 904 such that the package interface 708 and its associated package 908 are securely connected to this invention.

Figure 10:
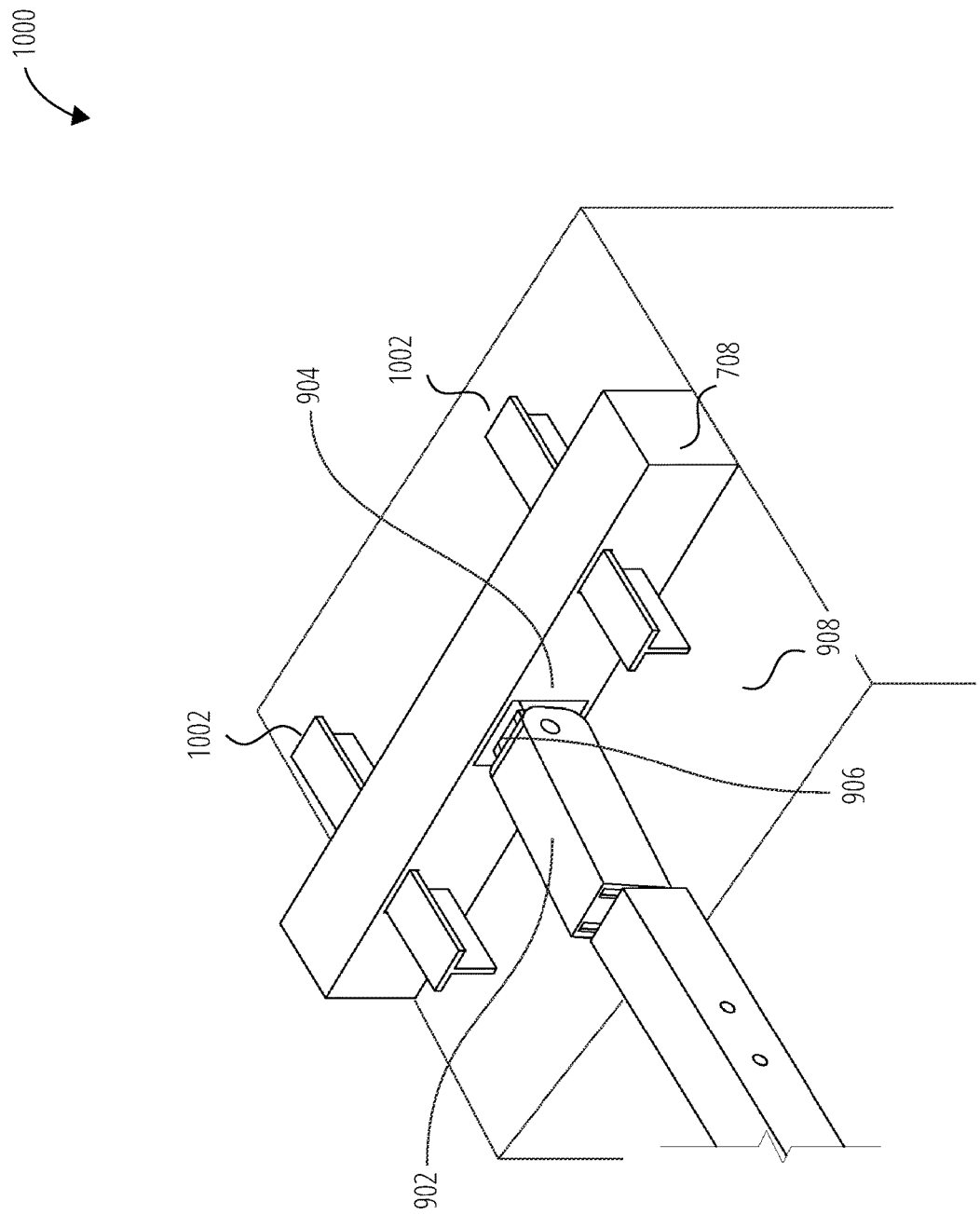
FIG. 10 illustrates a package receiving system with oblong member retracted 1000 in accordance with one embodiment.

FIG. 10 illustrates a package receiving system with oblong member retracted 1000 in accordance with one embodiment. Ratchet device 906 is actuated by an internal mechanism, or by an actuator above the assembly before oblong member 902 is retracted through the package interface opening 904. The oblong member 902 may disengage from the package interface opening 904 to free the package interface 708 from the receiving system in order to be lowered by the hoist mechanism. Supporting bars 1002 are actuated and supported by the package receiving system 702 and may penetrate the equivalent interface utilized by the drone during transport to support the package.

Figure 11:
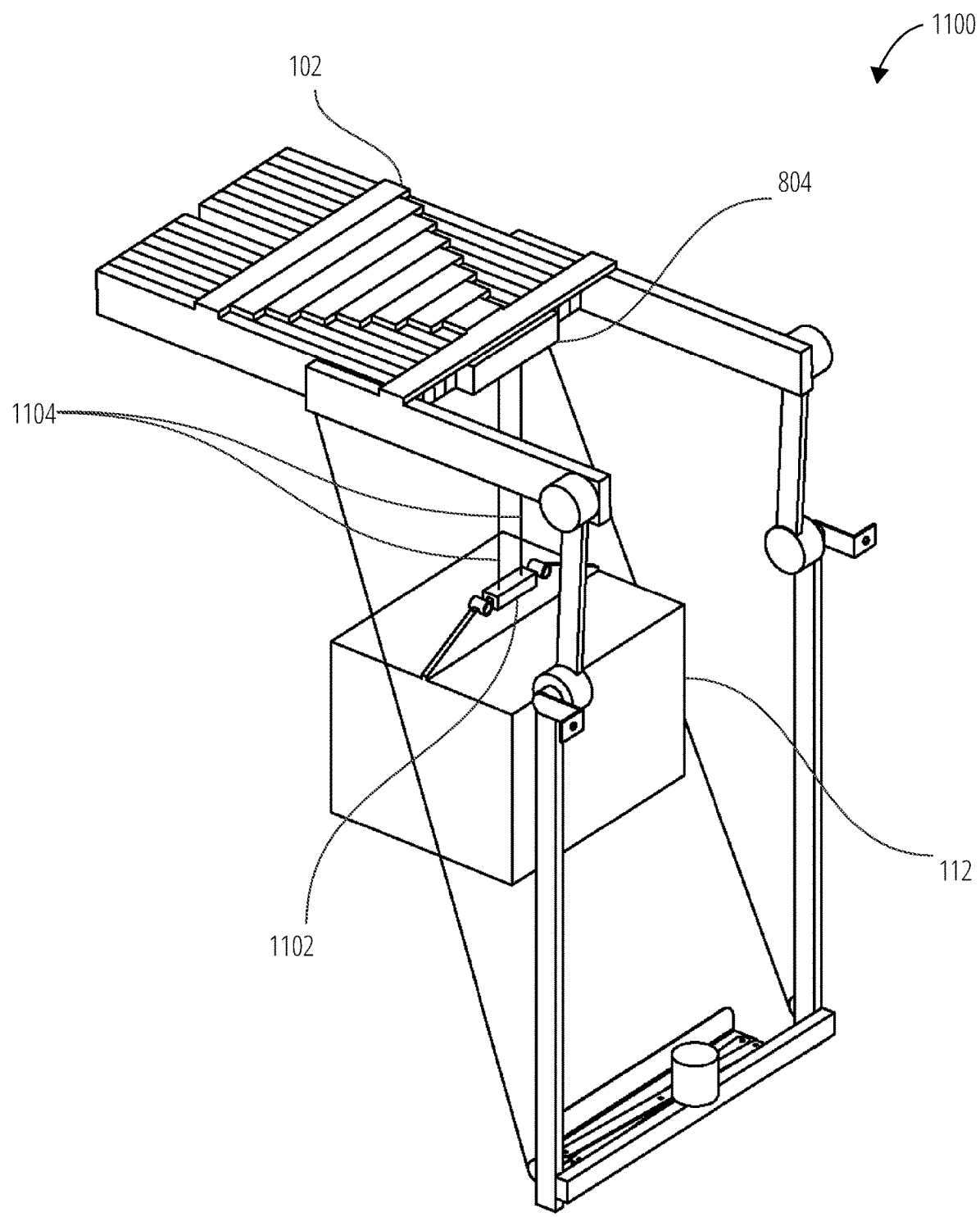
FIG. 11 illustrates a package lowering system 1100 in accordance with one embodiment.

FIG. 11 illustrates a package lowering system 1100 in accordance with one embodiment. Where a lowering system is included in the window-based delivery apparatus, the package 112 may be engaged by a clamp 1102 that is secured to the structure of the telescoping cantilever 102 by a hoist mechanism 804. The clamp 1102 may hold the package 112 while the receiving system is disengaged from the package 112. The clamp 1102 and the package 112 may then be lowered by the hoist mechanism 804 via a package lowering tensile member 1104, such as a cable or tape.

Figure 12:
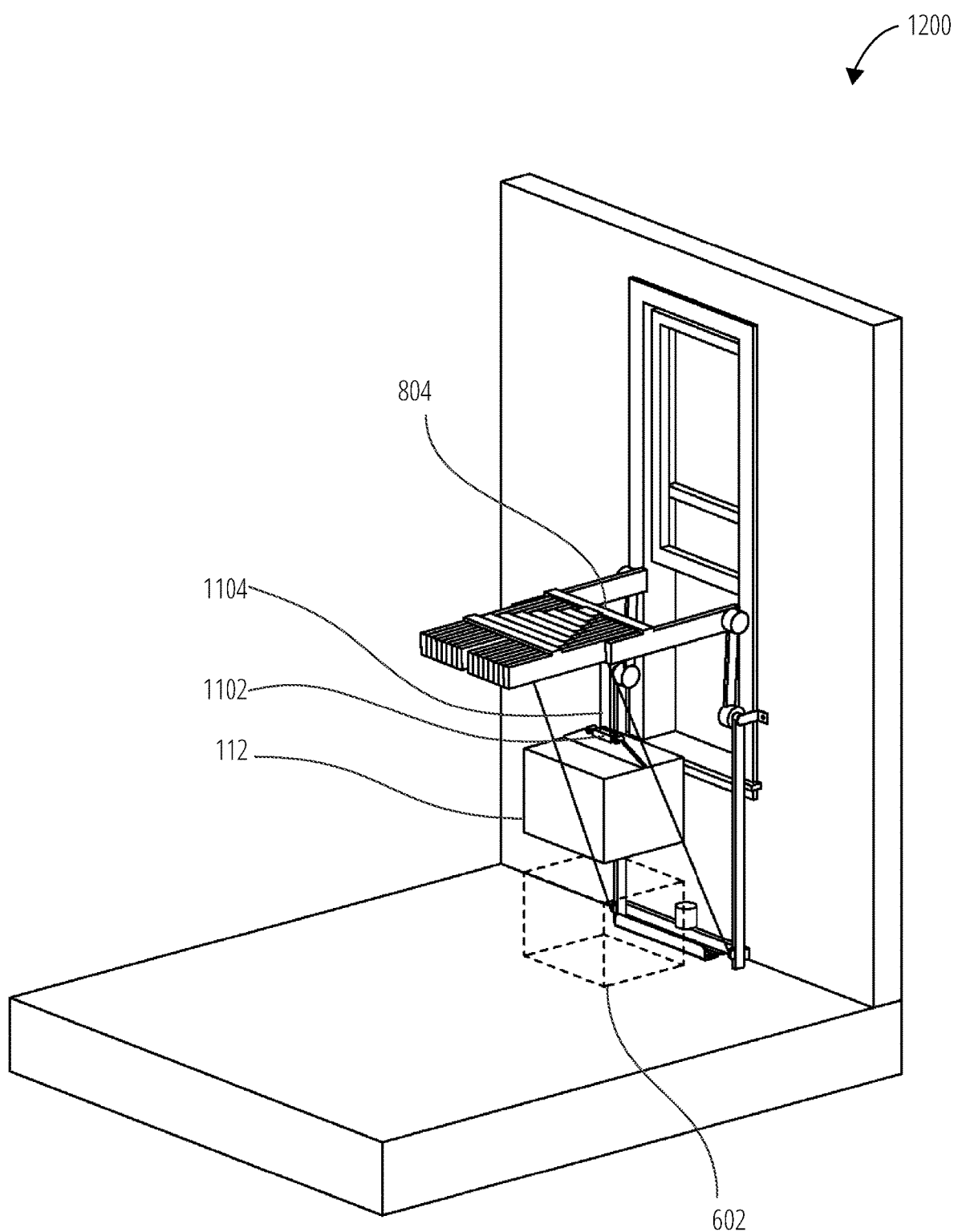
FIG. 12 illustrates a delivery platform lowering a package 1200 in accordance with one embodiment.

FIG. 12 illustrates a delivery platform lowering a package 1200 in accordance with one embodiment. The hoist mechanism 804 may release or lower the package lowering tensile member 1104 in order to lower the package 112. The package 112 may be secured to the package lowering tensile member 1104 and hoist mechanism 804 by means of the clamp 1102. The package 112 may be lowered directly downward into a package receiving spatial zone 602. Once at rest on the floor within the package receiving spatial zone 602, the clamp may release the package as shown in FIG. 15.

Figure 13:
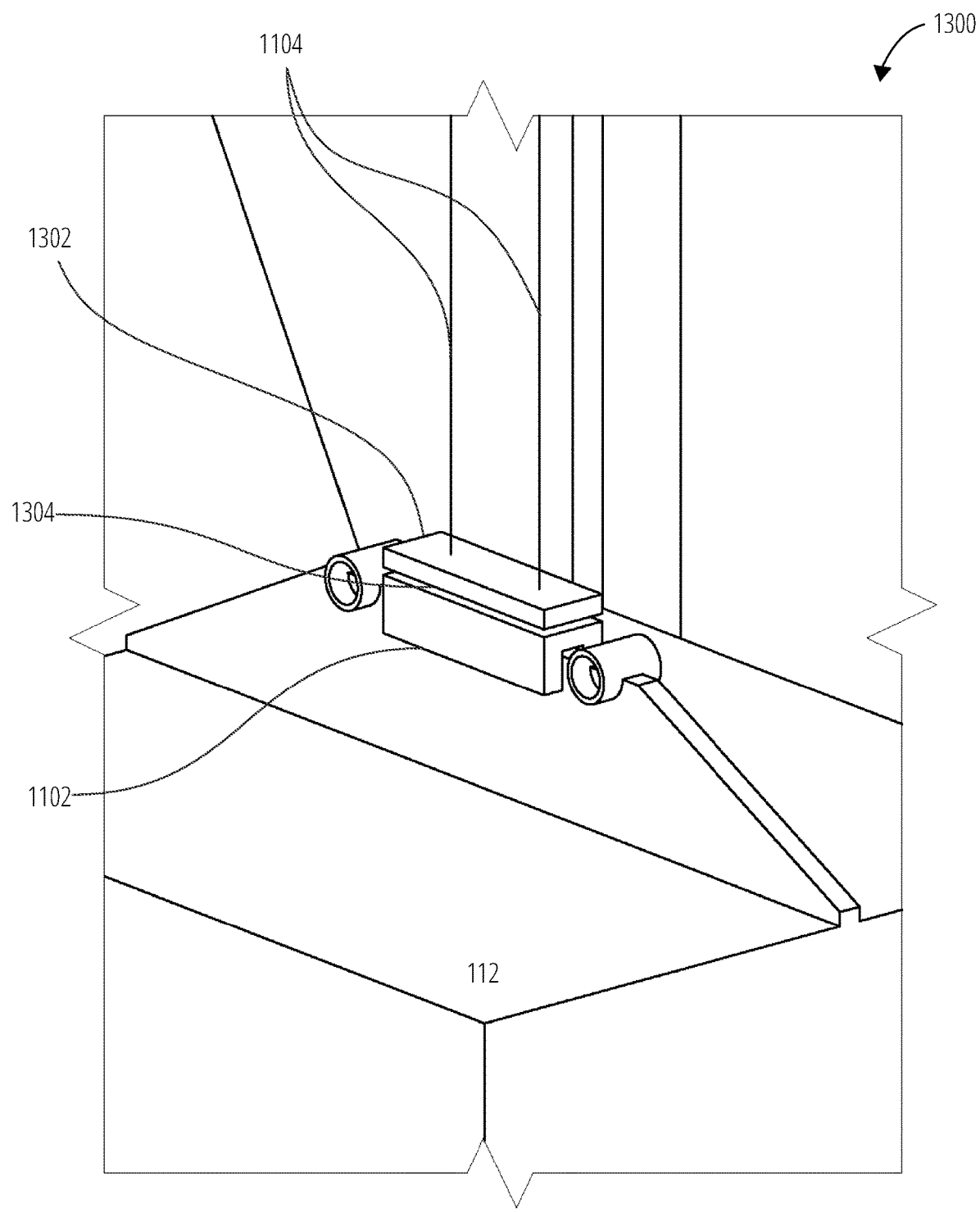
FIG. 13 illustrates a package clamping mechanism 1300 in accordance with one embodiment.

FIG. 13 illustrates a package clamping mechanism 1300 in accordance with one embodiment. At a height determined by the vertical length of the package 112, the clamp 1102 may be signaled to disengage the package 112. This release signal may be initiated by a variety of triggers that include visual sensors, a camera or cameras, calculating the length of the package lowering tensile member 1104 deployed relative to the height of the package 112, or a release mechanism 1304 between the clamp 1102 and the package lowering tensile member 1104. The release mechanism 1304 may be actuated when the package 112 encounters the floor, as shown in FIG. 14.

Figure 14:
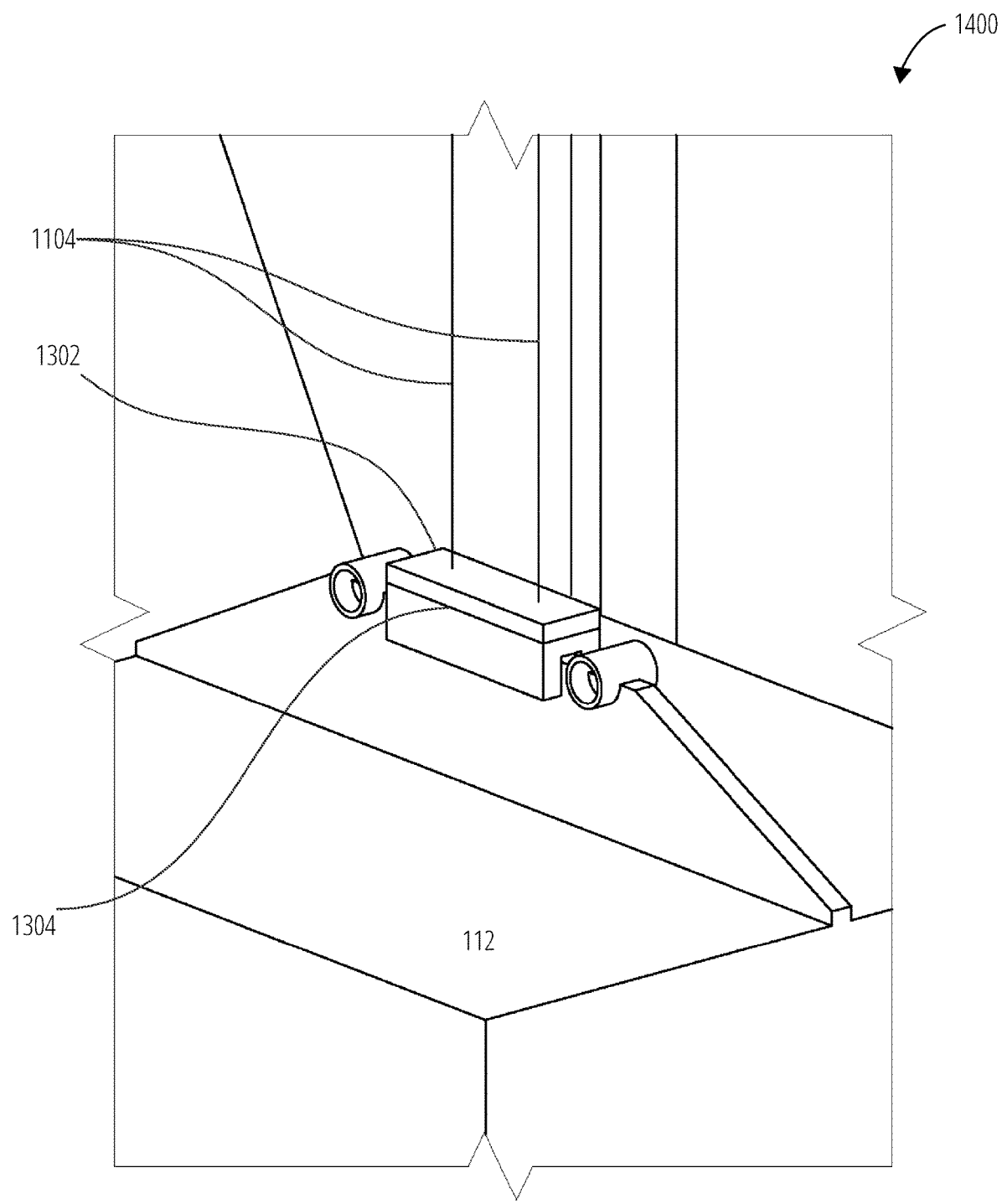
FIG. 14 illustrates releasing the package clamping mechanism 1400 in accordance with one embodiment.

FIG. 14 illustrates releasing the package clamping mechanism 1400 in accordance with one embodiment. As the package 112 comes to rest on the floor, the clamping mechanism 1302 may no longer be held above the switch by tension in the package lowering tensile member 1104. Gravity or a tensile spring may draw the clamping mechanism 1302 down onto the release mechanism 1304 as the package lowering tensile member 1104 descends an incremental distance toward the floor. This may actuate the release mechanism 1304, releasing the package from the clamping mechanism 1302, and by extension, the hoist mechanism.

Figure 15:
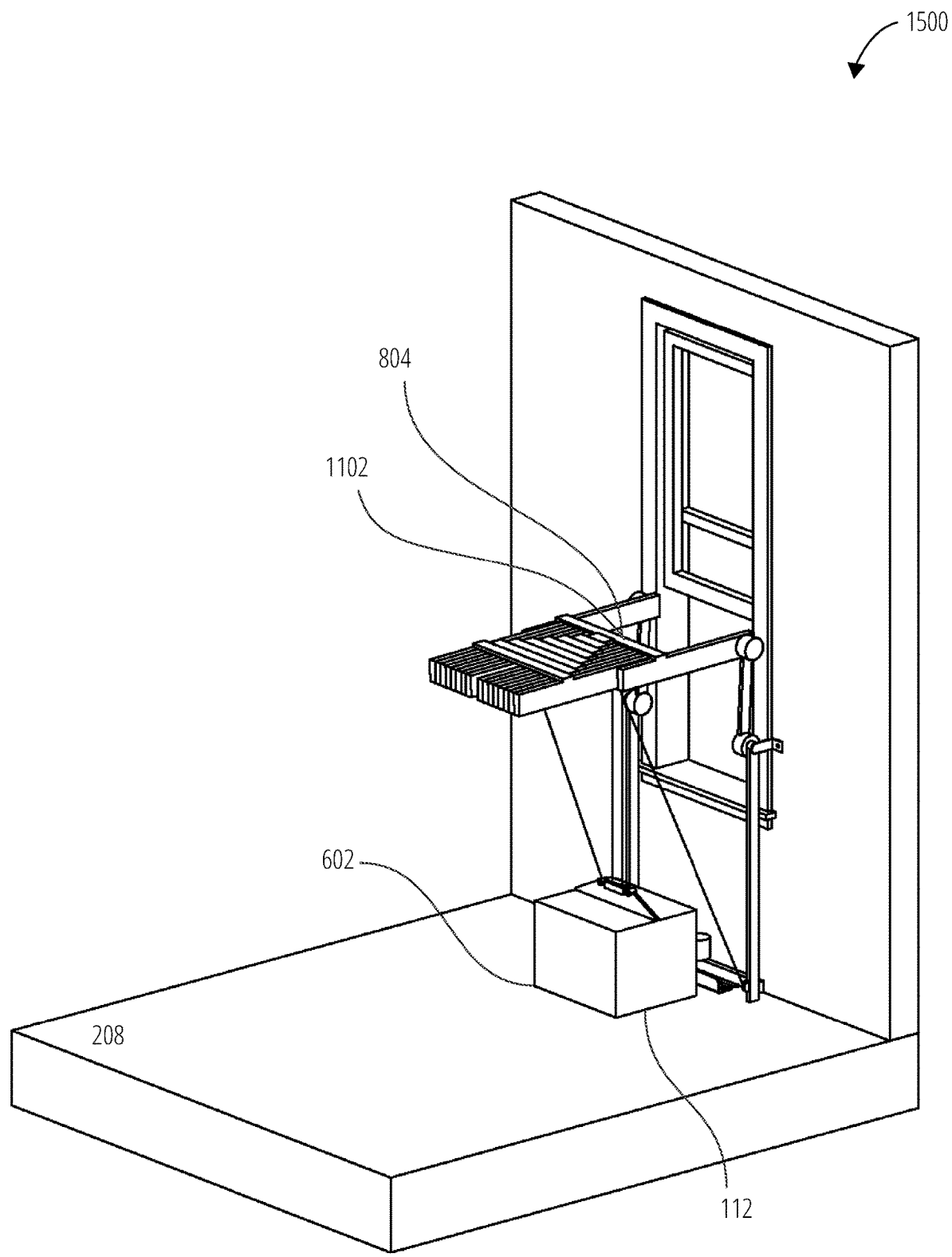
FIG. 15 illustrates a completed package lowering task 1500 in accordance with one embodiment.

FIG. 15 illustrates a completed package lowering task 1500 in accordance with one embodiment. The package now rests on the floor within the receiving section. The clamping mechanism has released, and the hoist mechanism has retracted back up to proximity with the receiving system. The cantilever is once more in pre-deployment position.

Figure 16:
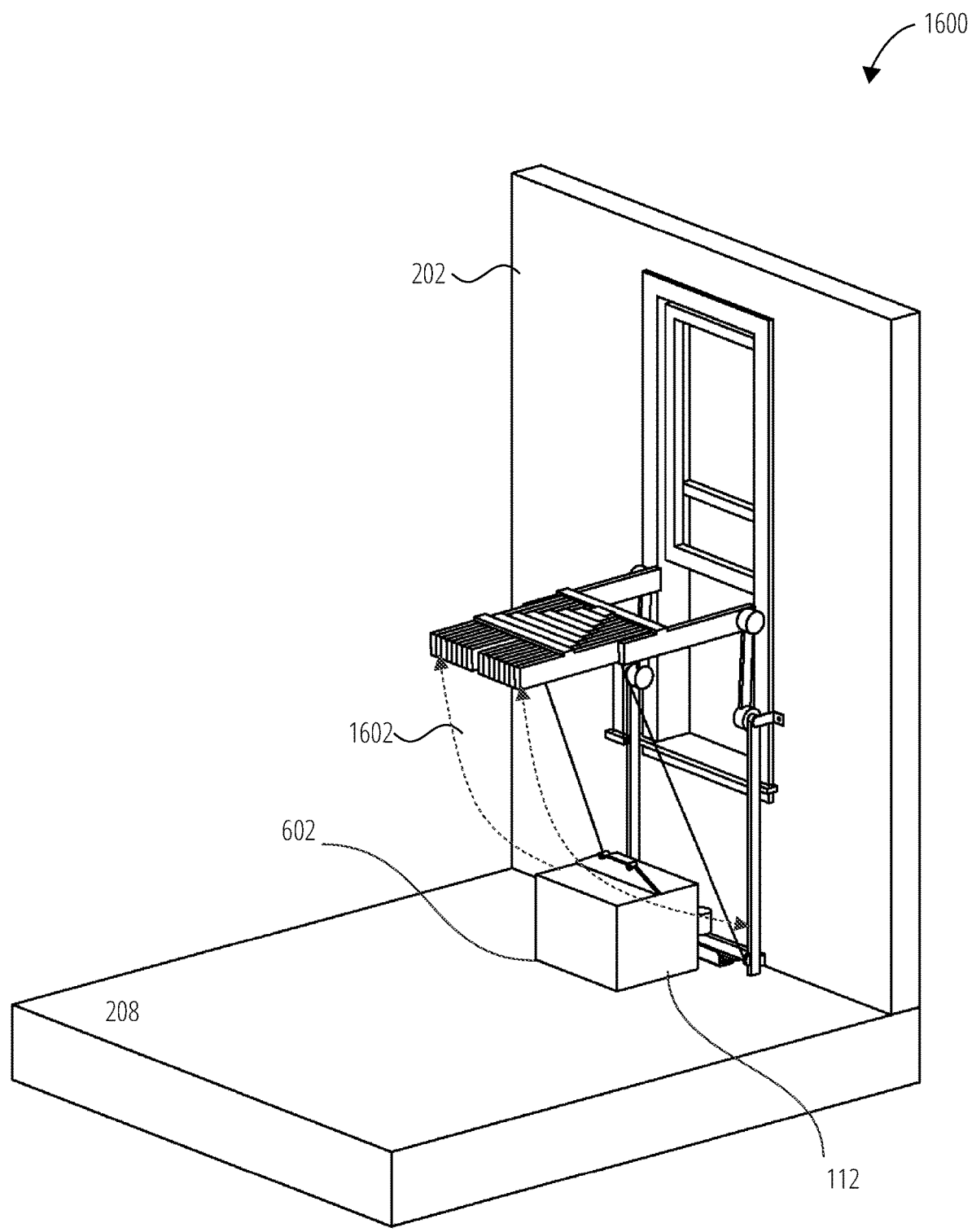
FIG. 16 illustrates a spatial conflict between delivery platform and lowered package 1600 in accordance with one embodiment.

FIG. 16 illustrates a spatial conflict between delivery platform and lowered package 1600 in accordance with one embodiment. When the package 112 has been deposited on the floor 208, it may be positioned within in a package receiving spatial zone 602. This package receiving spatial zone 602 may interfere with the telescoping cantilever deployment path 1602 as it is pulled toward or raised from the interior wall 202 to be stowed and deployed, respectively. A package moving system may be employed to correct this spatial conflict, as shown in FIG. 17.

Figure 17:
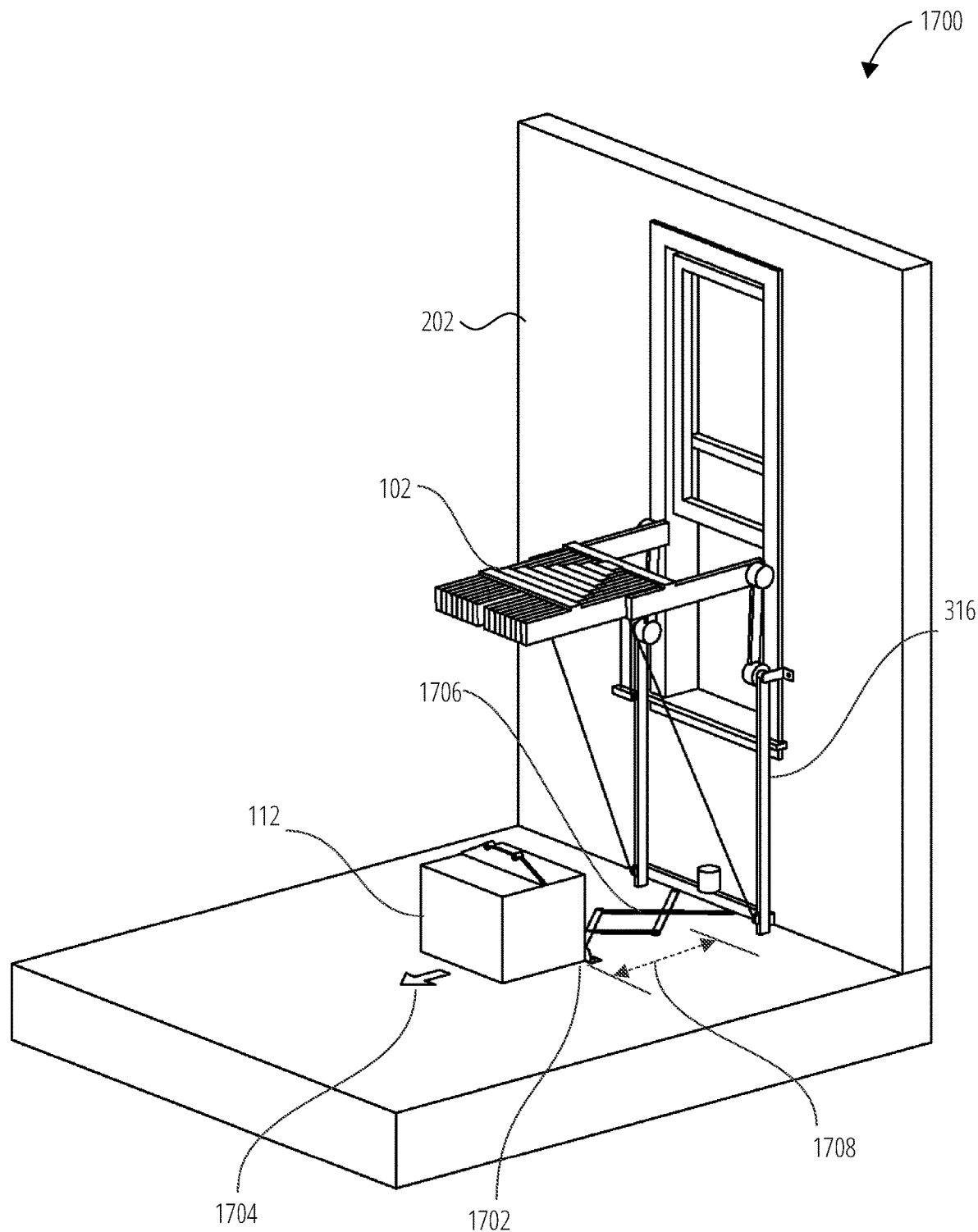
FIG. 17 illustrates a package pushing system in use 1700 in accordance with one embodiment.

FIG. 17 illustrates a package moving system that is referred to as a package pushing system in use 1700 in accordance with one embodiment. In order to move the package 112 away from the receiving section, a pushing mechanism 1706 may be actuated to press against the bottom edge 1702 of the package 112 in a clearance direction 1704 orthogonal to and away from the interior wall 202. The pushing mechanism 1706 may be stowed in a position between and approximately equidistant from the stationary columns 316, adjacent to the floor 208 and the interior wall 202. The pushing mechanism 1706 may be actuated across a sufficient clearance distance 1708 to move the package 112 far enough away from the interior wall 202 (FIG. 19) to allow the telescoping cantilever 102 to return to its stowed position (FIG. 20).

The package moving system may include at least one or more of a swiping arm, a conveyor belt, a pulling system, or a scissor mechanism attached to a pushing plane.

Figure 18:
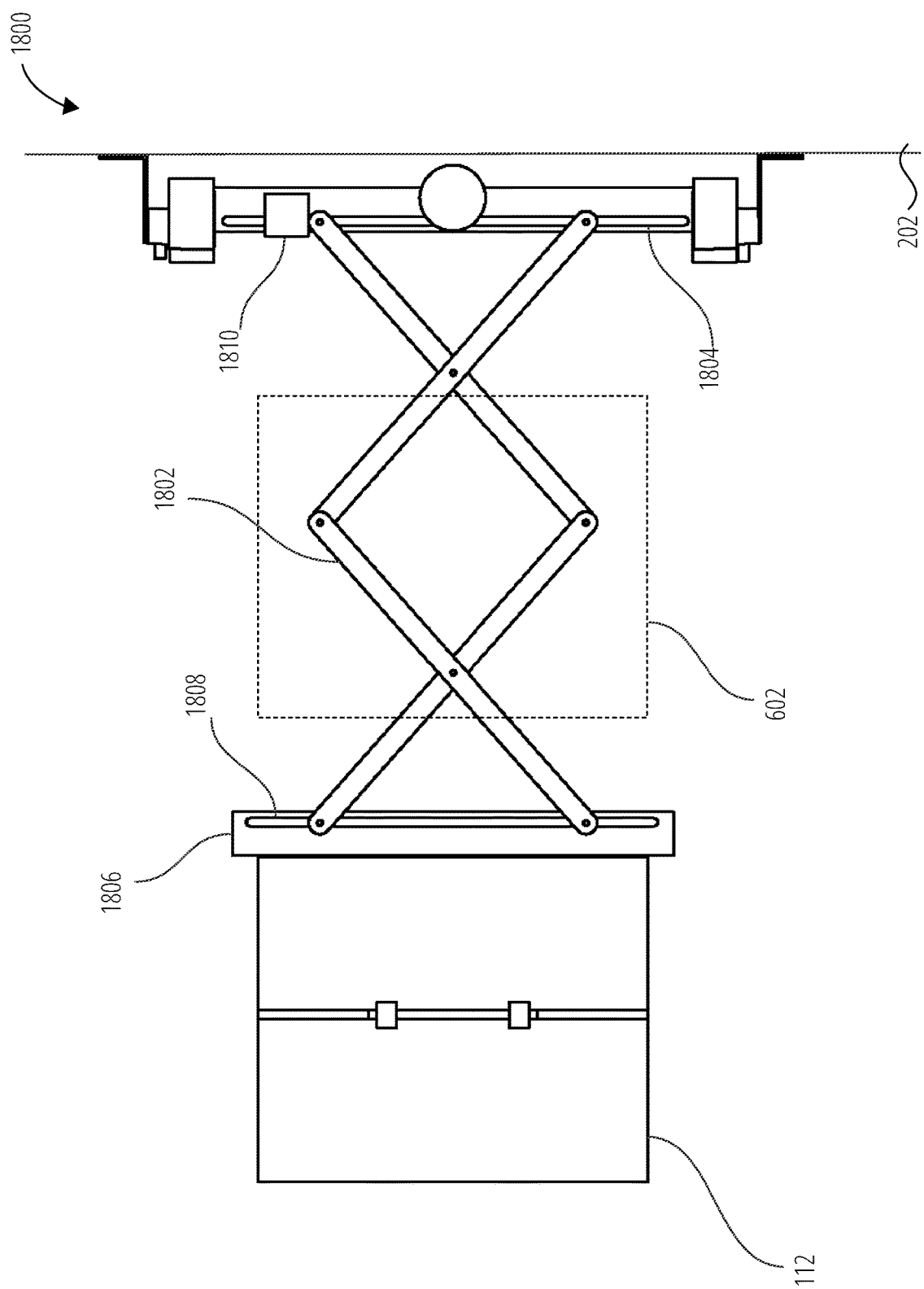
FIG. 18 illustrates a package pushing system 1800 in accordance with one embodiment.

FIG. 18 illustrates a package pushing system 1800 in accordance with one embodiment. The package pushing system 1800 may comprise a scissor mechanism 1802, actuated by any commonly used mechanical means. In the illustrated embodiment, a scissor mechanism motor 1810 and threaded rod assembly 1804 may draw the vertices of the scissor mechanism 1802 together, in order to extend a pushing plane 1806.

The pushing plane 1806 may be made from a stiff material such as steel, and may be attached at the end of the scissor mechanism 1802 opposite from the interior wall 202. The pushing plane 1806 may be connected to the scissor mechanism 1802 via slots 1808 along an axis parallel to the interior wall 202. The pushing plane 1806 may remain parallel to the interior wall 202 as the scissor mechanism 1802 is actuated.

Because the pushing mechanism 1706 may completely move the package 112 out of the package receiving spatial zone 602, another package may be deposited in the package receiving spatial zone 602 during a later package delivery sequence. The pushing mechanism 1706 may push multiple packages out of the package receiving spatial zone 602 (FIG. 21), thereby allowing unattended use of the window-based delivery apparatus for as long as space permits in the direction the packages are pushed.

Figure 19:
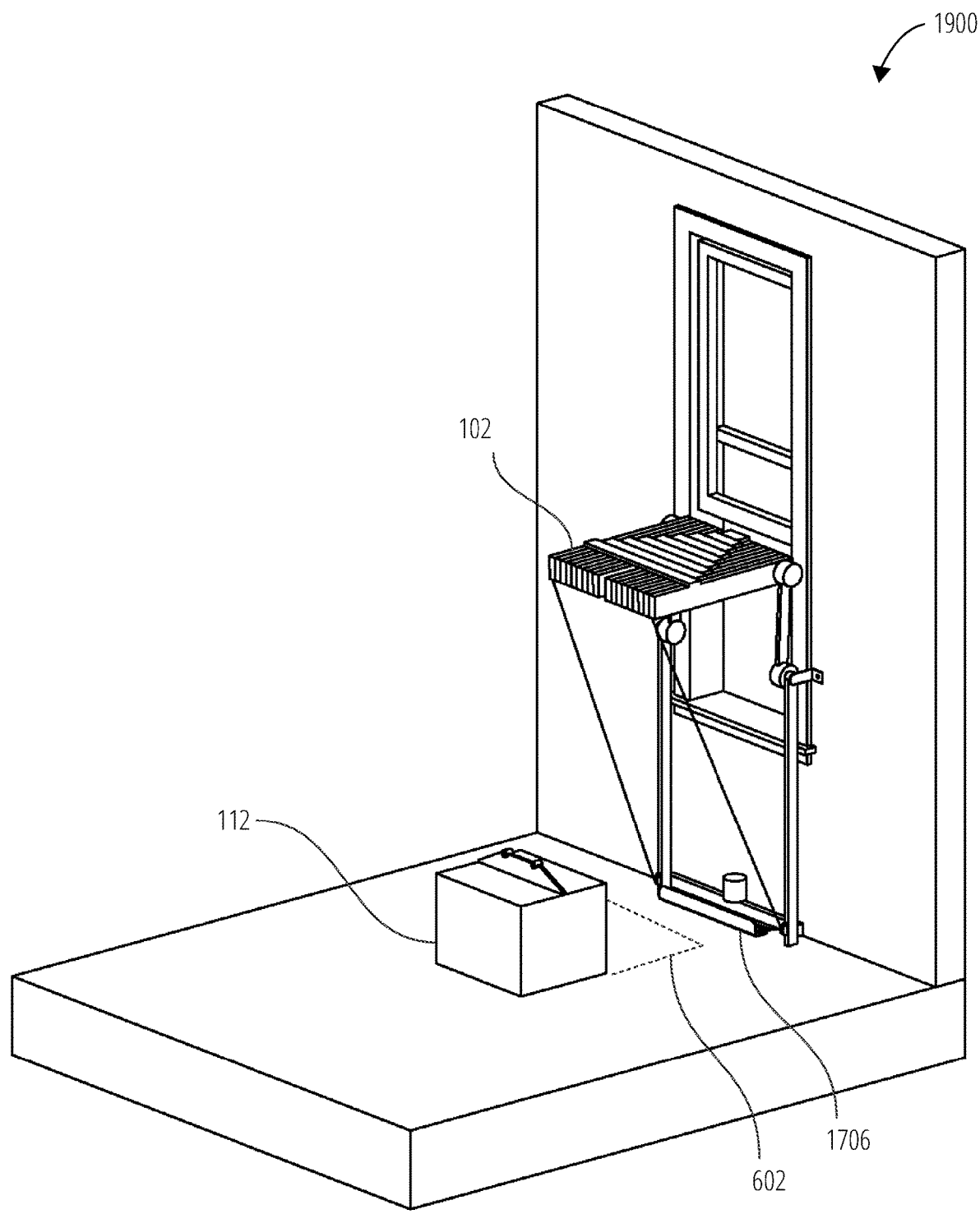
FIG. 19 illustrates a package delivered and removed from receiving section 1900 in accordance with one embodiment.
Figure 20:
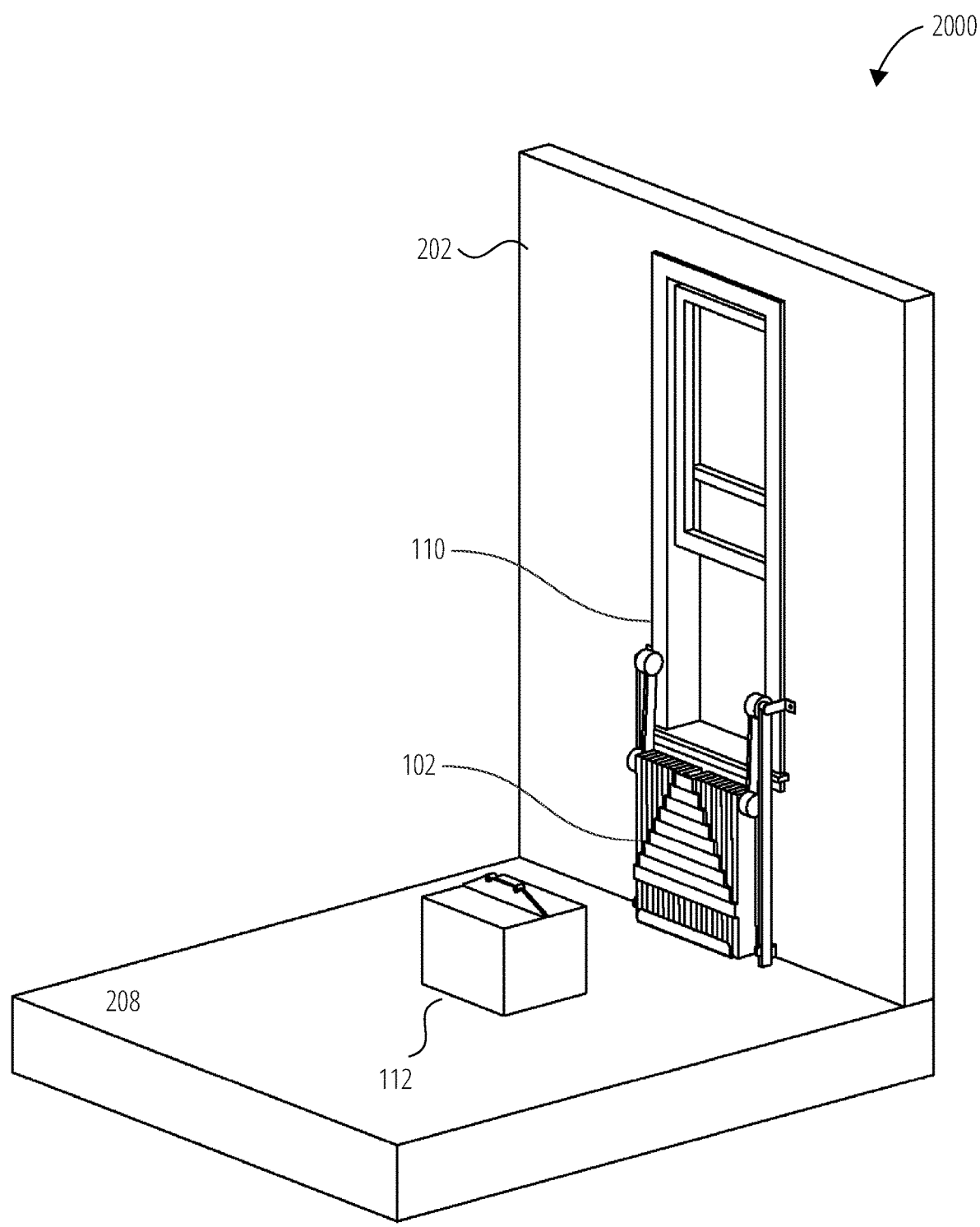
FIG. 20 illustrates a delivery platform stowed after use 2000 in accordance with one embodiment.

FIG. 19 illustrates a package delivered and removed from receiving section 1900 in accordance with one embodiment. The telescoping cantilever 102 is shown in the pre-deployment position, ready to receive a new package delivery. A previously delivered package 112 has been pushed out of the way by the pushing mechanism 1706. The pushing mechanism 1706 has returned to its retracted position near the wall and between the stationary columns. The package receiving spatial zone 602 is clear, leaving room for a new package to be lowered after delivery.

FIG. 20 illustrates a delivery platform stowed after use 2000 in accordance with one embodiment. The telescoping cantilever 102, even when fully retracted with all plurality of cantilever segments 106 compactly arranged, may be an obstruction in the window or opening 110. In addition to being aesthetically undesirable, as an obstruction in this position it may be a safety risk when a person needs to use the window to escape the building, such as in the event of a fire, or if a first responder agent attempts to enter through said window during an emergency event.

As is shown in FIG. 20, once the package 112 is detached and moved out of the package receiving spatial zone 602, the telescoping cantilever 102 may be retracted and returned to a stowed position, beneath the opening 110 and along a low profile against the interior wall 202. This may be accomplished by a sequence of operations that is the reverse of the sequence used to move the telescoping cantilever 102 into the pre-deployment position.

Figure 21:
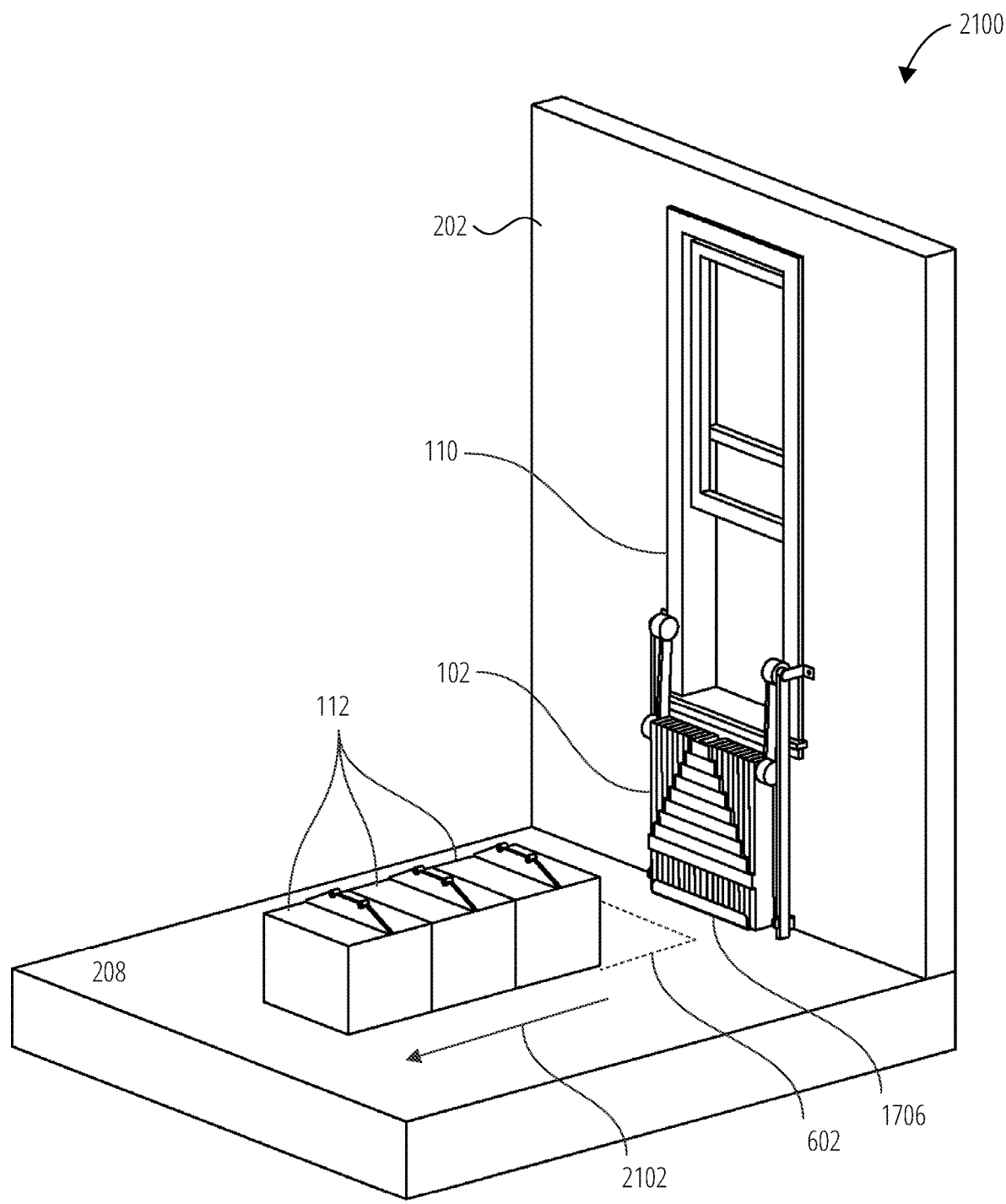
FIG. 21 illustrates a delivery platform after multiple uses 2100 in accordance with one embodiment.

FIG. 21 illustrates a delivery platform after multiple uses 2100 in accordance with one embodiment. As each package 112 arrives and is pushed out of the package receiving spatial zone 602 by the pushing mechanism 1706, a queue of packages may form, as long as there is room in the direction the packages are pushed 2102. This allows for future deliveries, as well as permitting the telescoping cantilever 102 to be stowed beneath the opening 110 and against the interior wall 202 between uses.

Figure 22:
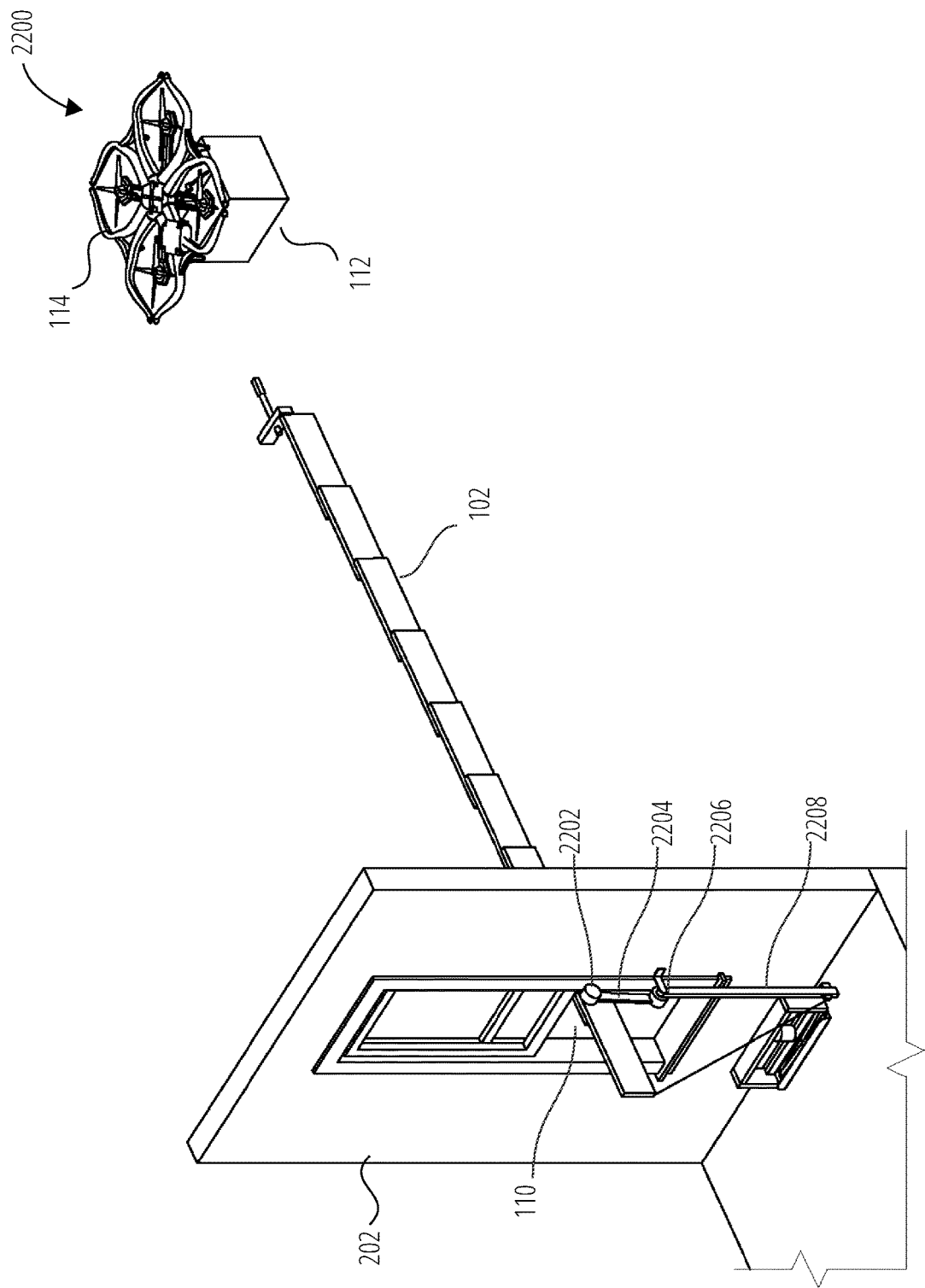
FIG. 22 illustrates a single-sided telescoping cantilever 2200 in accordance with one embodiment.

FIG. 22 illustrates a single-sided telescoping cantilever 2200 in accordance with one embodiment. The single-sided telescoping cantilever 2200 may comprise the same functional elements as illustrated above, and may perform the same tasks following the same processes. In this embodiment, the telescoping cantilever 102 is simple a single cantilever, instead of a dual cantilever with crossbar connections. In this case, the upper joint 2202, pivoting column 2204, lower joint 2206, and stationary column 2208 may be attached along only one side of the opening 110. These may function as described above, but may be designed with dimensions and materials appropriate to supporting the entire weight of the apparatus, package, and unmanned aerial vehicle 114. Additionally, a fully retracted telescoping cantilever 102 may not be required to fold against the interior wall 202. Additionally, a fully retracted telescoping cantilever 102 may rotate only at upper joint 2202 and be positioned along one of the vertical edges of the opening 110.

Figure 23:
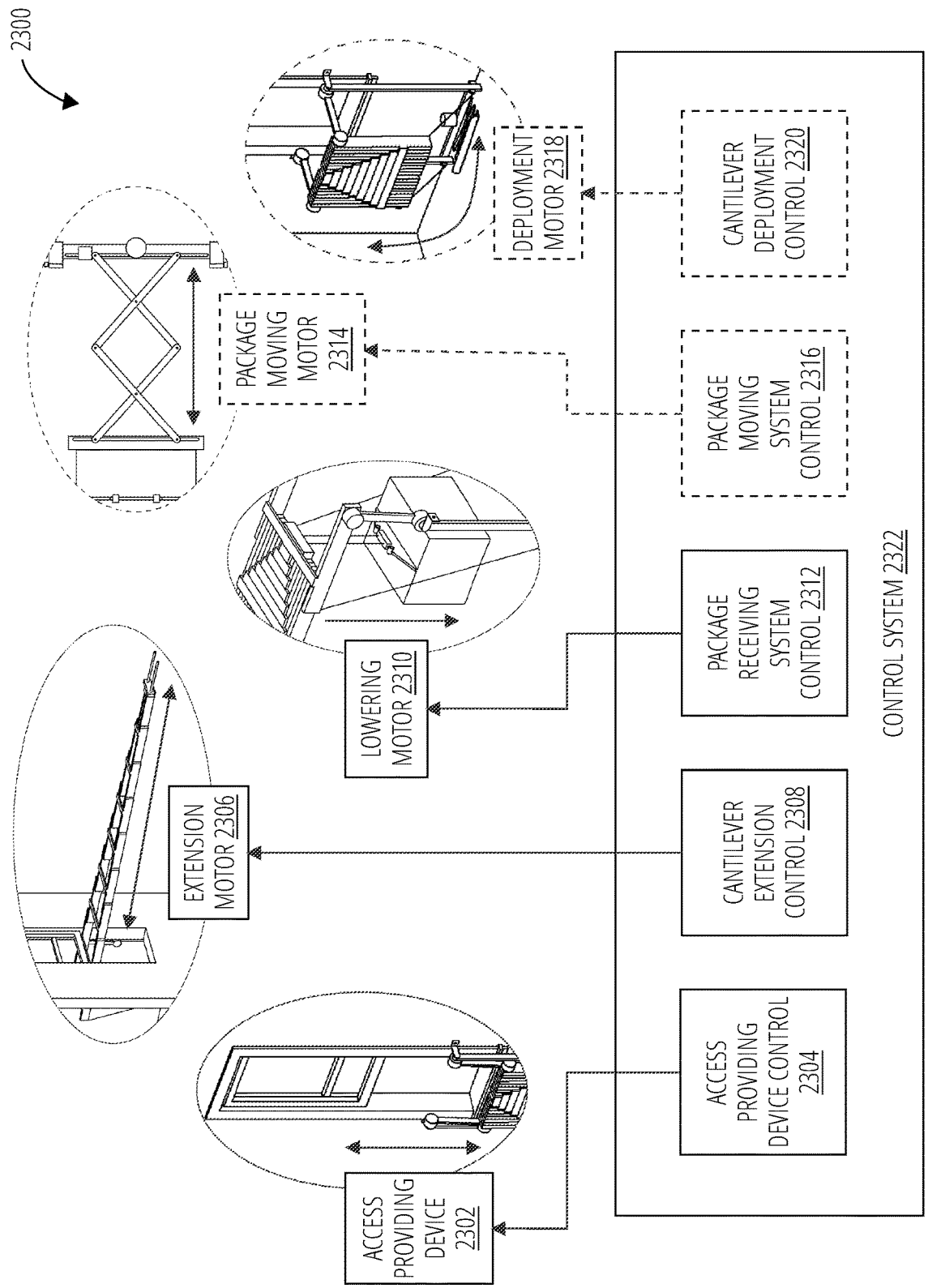
FIG. 23 illustrates a package delivery system 2300 in accordance with one embodiment.

Referring to FIG. 23, a package delivery system 2300 may comprise at least one or more of an access providing device 2302, an access providing device control 2304, an extension motor 2306, a cantilever extension control 2308, a lowering motor 2310, a package receiving system control 2312, a package moving motor 2314, a package moving system control 2316, a deployment motor 2318, a cantilever deployment control 2320, and a control system 2322.

The control system 2322 may be used to control one or more of the access providing device 2302, the extension motor 2306, the lowering motor 2310, the pack package moving motor 2314, or the deployment motor 2318. The control system 2322 may receive an external signal that may initiate or control the processes. The control system 2322 may communicate with external sources supplying the external signal using an Etherenet connection, a Wi-Fi connection, a Bluetooth connection, radio-frequency identification (RFID), etc.

The method, system, and apparatus in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A delivery platform for receiving a package, the delivery platform comprising:

an extendable cantilever, wherein the extendable cantilever is located inside of an opening in a wall of a structure when in a retracted position, and is configured to extend through the opening in the wall to an extended position outside of the structure, the extendable cantilever comprising:
  a cantilever base element located inside of the opening in the wall of the structure; and
  a plurality of cantilever segments slidably attached to the cantilever base element or to at least one other of the plurality of cantilever segments, the plurality of cantilever segments configured to retract to the retracted position entirely inside of the opening in the wall and configured to extend through the opening in the wall to the extended position outside of the structure;
at least one pivoting column including a first end and a second end, wherein the first end of the at least one pivoting column is rotationally coupled to the cantilever base element using an upper joint;
at least one mount securing the telescoping cantilever in close proximity to the opening in the wall of the structure, wherein the second end of the at least one pivoting column is rotationally coupled to the at least one mount using a lower joint;
a package delivery system interface configured to receive the package delivered outside of the opening in the structure, wherein the package delivery system interface is mounted to the extendable cantilever; and
a package receiving system, wherein a portion of the package receiving system is mounted to the extendable cantilever, and the package receiving system is configured to position the package over a package receiving spatial zone inside of the opening in the structure.

2. The delivery platform of claim 1, further comprising a cantilever segment motor configured to slidably extend or retract the plurality of cantilever segments.

3. The delivery platform of claim 1, wherein the at least one pivoting column may rotate about 180 degrees around the lower joint from a substantially vertical position above the lower joint to a substantially vertical position below the lower joint.

4. The delivery platform of claim 3, further comprising:
at least one first rotational spring configured to act on the lower joint and at least one second rotational spring configured to act on the upper joint such that the telescoping cantilever is oriented in a pre-deployed orientation or a deployed orientation;
the pre-deployed orientation including the upper joint oriented in a substantially vertical position directly above the lower joint, the cantilever base element in a horizontal position substantially orthogonal to the opening of the structure, and the plurality of cantilever segments in the retracted position; and
the deployed orientation including the upper joint oriented in the substantially vertical position directly above the lower joint, the cantilever base element in the horizontal position substantially orthogonal to the opening of the structure, and the plurality of cantilever segments in the extended position.

5. The delivery platform of claim 3, further comprising a deployment system configured to place the telescoping cantilever in a pre-deployed orientation or a stowed orientation, the deployment system comprising:
  a guiding member configured to limit motion of the telescoping cantilever along a path between the stowed orientation and the pre-deployed orientation;
  a deployment motor configured to move the telescoping cantilever along the guiding member in order to place the telescoping cantilever in the stowed orientation or the pre deployed orientation;
  the pre-deployed orientation including the upper joint oriented in a substantially vertical position directly above the lower joint, the cantilever base element in a horizontal position substantially perpendicular to the opening of the structure, and the plurality of cantilever segments in the retracted position; and
  the stowed orientation including the upper joint oriented in the substantially vertical position directly below the lower joint, the cantilever base element in a vertical position substantially parallel to the opening of the structure, and the plurality of cantilever segments in the retracted position.

6. The delivery platform of claim 5, wherein the guiding member comprises at least one deployment tensile member attached to an anterior portion of the cantilever base element and attached to a lower attachment position in close proximity to a floor and the wall below the opening, and the deployment motor comprises a base motor configured to lengthen or shorten a portion of the at least one deployment tensile member between the anterior portion of the cantilever base element and the lower attachment position, thereby placing the telescoping cantilever in the pre-deployed orientation or the stowed orientation.

7. The delivery platform of claim 1, further comprising at least one stationary column, wherein the at least one stationary column is substantially vertically oriented with respect to the wall and in close proximity to the wall, one end of the at least one stationary column is attached in close proximity to a floor near the wall, and another end of the at least one stationary column is coupled to the lower joint.

8. The delivery platform of claim 1, wherein the package delivery system interface is at least one oblong member configured to allow insertion into a corresponding package opening on the package or a package interface mounted on the package.

9. The delivery platform of claim 1, wherein the package receiving system comprises a package lowering system including:
  a clamp comprising:
    a clamping mechanism configured to hold the package above a floor while the package receiving system is disengaged from the package; and
    a release mechanism, wherein the clamp is configured to release the package upon receipt of a release signal;
  a package lowering tensile member configured to lower at least a portion of the clamp toward the floor; and
  a package lowering tensile member motor configured to retract or extend the package lowering tensile member.

10. The delivery platform of claim 9, further comprising a package moving system for moving the package that has been lowered to the floor.

11. The package moving system of claim 10, wherein the package moving system comprises at least one or more of a swiping arm, a conveyor belt, a pulling system, or a scissor mechanism attached to a pushing plane.

12. The delivery platform of claim 1, further comprising a control system configured to control operation of at least one or more of the extendable cantilever, the package delivery system interface, or the package receiving system.

13. A package delivery system comprising:
a delivery platform for receiving a package including:
- an extendable cantilever, wherein the extendable cantilever is located inside of an opening in a wall of a structure when in a retracted position, and is configured to extend through the opening in the wall to an extended position outside of the structure;
- an access providing device configured to open or close the opening in the wall of the structure;
- a package delivery system interface configured to receive the package delivered outside of the opening in the structure, wherein the package delivery system interface is mounted to the extendable cantilever; and
- a package receiving system, wherein a portion of the package receiving system is mounted to the extendable cantilever, and the package receiving system is configured to position the package over a package receiving spatial zone inside of the opening in the structure, the package receiving system comprising a package lowering system, the package lowering system including:
  - a clamp comprising:
    - a clamping mechanism configured to hold the package above a floor while the package receiving system is disengaged from the package; and
    - a release mechanism, wherein the clamp is configured to release the package upon receipt of a release signal;
  - a package lowering tensile member configured to lower at least a portion of the clamp toward the floor; and
  - a package lowering tensile member motor configured to retract or extend the package lowering tensile member.

14. The package delivery system of claim 13, further comprising a control system configured to control operation of at least one or more of an access providing device, the extendable cantilever, the package delivery system interface, or the package receiving system.

15. The package delivery system of claim 13, wherein the package delivery system interface is at least one oblong member configured to allow insertion into a corresponding package opening on the package or a package interface mounted on the package.

16. The package delivery system of claim 13, further comprising a package moving system for moving the package that has been lowered to the floor, wherein the package moving system includes at least one or more of a swiping arm, a conveyor belt, a pulling system, or a scissor mechanism attached to a pushing plane.

* * * * *